United States Patent [19]
Montgomery et al.

[11] Patent Number: 5,854,835
[45] Date of Patent: *Dec. 29, 1998

[54] TELECOMMUNICATIONS NETWORK CIRCUIT USAGE MEASUREMENT

[75] Inventors: Robert H. Montgomery, Herndon; J. Alfred Baird, Fairfax; Robert D. Farris, Sterling, all of Va.

[73] Assignee: Bell Atlantic Network Services, Inc., Arlington, Va.

[*] Notice: The term of this patent shall not extend beyond the expiration date of Pat. No. 5,809,120.

[21] Appl. No.: 598,768

[22] Filed: Feb. 9, 1996

Related U.S. Application Data

[63] Continuation-in-part of Ser. No. 598,772, Feb. 9, 1996, and Ser. No. 598,869, Feb. 9, 1996.

[51] Int. Cl.⁶ .............. H04M 15/00; H04M 3/00
[52] U.S. Cl. .............. 379/119; 375/133; 375/269; 375/327
[58] Field of Search ............... 379/112, 113, 379/114, 115, 122, 125, 126, 127, 133, 134, 135, 136, 221; 248/1–5; 455/2; 370/419, 420, 421, 357, 359; 375/243, 269, 325–327

[56] References Cited

U.S. PATENT DOCUMENTS

| | | |
|---|---|---|
| 4,381,522 | 4/1983 | Lambert . |
| 4,506,387 | 3/1985 | Walter . |
| 4,888,638 | 12/1989 | Bohn . |
| 4,890,320 | 12/1989 | Monslow et al. . |
| 4,893,248 | 1/1990 | Pitts et al. . |
| 4,949,187 | 8/1990 | Cohen . |
| 4,963,995 | 10/1990 | Lang . |
| 4,995,078 | 2/1991 | Monslow et al. . |
| 5,027,400 | 6/1991 | Baji et al. . |
| 5,057,932 | 10/1991 | Lang . |
| 5,065,393 | 11/1991 | Sibbit et al. ............. 348/3 |
| 5,130,792 | 7/1992 | Tindell et al. . |
| 5,132,992 | 7/1992 | Yurt et al. . |
| 5,133,079 | 7/1992 | Ballantyne et al. . |
| 5,200,993 | 4/1993 | Wheeler et al. . |
| 5,247,347 | 9/1993 | Litteral et al. . |
| 5,247,571 | 9/1993 | Kay et al. . |
| 5,253,275 | 10/1993 | Yurt et al. . |
| 5,363,433 | 11/1994 | Isono .......................... 348/1 |
| 5,377,186 | 12/1994 | Wegner et al. . |
| 5,410,343 | 4/1995 | Coddington et al. . |
| 5,475,740 | 12/1995 | Biggs, Jr. et al. ............. 348/3 |
| 5,483,276 | 1/1996 | Brooks et al. .............. 348/1 |
| 5,499,046 | 3/1996 | Schiller et al. ............. 348/3 |
| 5,515,425 | 5/1996 | Penzias et al. ............ 379/113 |
| 5,553,124 | 9/1996 | Brinskele ................ 379/113 |
| 5,581,610 | 12/1996 | Hooshiari ................ 379/113 |

OTHER PUBLICATIONS

Brian Oliver et al, U.S. Patent Application Ser. No. 08/405,685, filed Mar. 17, 1995.

*Primary Examiner*—Paul Loomis
*Attorney, Agent, or Firm*—McDermott, Will & Emery

[57] ABSTRACT

A system and method is provided for using underused or unused local telephone company local loops to subscriber premises for providing to such premises a connection to an alternate service provider having a common channel signaling controlled switched network. The use of the local loop is leased to the service provider at a rate dependent upon the usage of the circuit. Information and data to permit efficient and convenient billing for leased usage of the loops is implemented by linking the common channel signaling control network of the telephone network and the common channel signaling control network of the service provider network. Common channel signaling control signals indicating call set-up and call tear-down are transmitted by the service provider's common channel signaling network to and stored in the telephone common channel signaling network in the storage of the controller therein to permit billing therefrom. Alternatively call set-up and tear-down are signaled by signals utilizing transaction capabilities application part (TCAP) protocol.

37 Claims, 13 Drawing Sheets

TELECOMMUNICATIONS NETWORK CIRCUIT USAGE MEASUREMENT

RELATED APPLICATIONS

This application is a continuation-in-part of application Ser. No. 08/598,772, filed Feb. 9, 1996, and application Ser. No. 08/598,869, filed Feb. 9, 1996.

FIELD OF INVENTION

This invention relates to the measurement of usage of specific portions of links in a telecommunications network and, more particularly, to a system and method for monitoring, detecting and measuring third party usage of predetermined links in a telecommunication network.

BACKGROUND ART

In the current communications environment multiple types of communication services and/or broadcasts are being provided to communication service customers over varying types of delivery links provided by different service providers. Telecommunications services are being provided to residences and businesses via the conventional loop and trunk circuits over which both voice and data are transmitted. At the present time the data transmissions over these circuits include facsimile, packet, imaging, and video content.

U.S. Pat. No. 5,200,993, issued Apr. 6, 1993, to Wheeler et al., describes a public telephone network which includes enhanced capabilities with a distributed imaging system. The distributed imaging system provides centralized image processing to end users and access to a range of image management capabilities residing on a shared platform distributed through a switched telephone system. The shared platform functions as a service bureau in delivering such capabilities to end users.

The distributed imaging system embodies an image platform based on the client-server model with standard communications interfaces to service multiple separate user groups accessing different applications. User groups can supply applications programs which are stored and run on the central hardware in support of respective user requirements. The image server operations are provided as functional primitives. User applications are provided by combining the primitives in a control script.

U.S. Pat. No. 5,247,347, issued Sep. 21, 1993, to Litteral et al., describes a public switched telephone network architecture for providing video-on-demand services. A subscriber uses either a standard telephone instrument over the public switched telephone network or a dedicated control device over an ISDN packet network to order video programming. The request is transmitted to a designated video information provider and digital transmission connectivity is established between the video information provider and the central office serving the subscriber. Connectivity between the central office and subscriber is provided by asymmetrical digital subscriber line interface units over a local loop. The interface units frequency multiplex digital video information with voice information to the subscriber and support transmission of a reverse transmission channel from the subscriber to the central office for transmission on the ISDN packet data network back to the video information provider. The interfaces also allow baseband signaling and audio between the central office and the subscriber for conventional telephone instrument connectivity.

U.S. Pat. No. 5,410,343, issued Apr. 25, 1995, to Coddington, et al., describes video-on-demand services using the public switched telephone network. In this system a central office based public switched telephone network is used for supplying video information from a digital information storage medium to designated subscriber premises. The system utilizes subscriber loop transmission means for transferring (1) selected video information from a central office to the subscriber premises, (2) subscriber order data from the subscriber premises to the central office location, and (3) telephone service signals between the subscriber premises and the central office.

A switch at the central office receives the subscriber order data from the subscriber loop transmission means. A video gateway in turn is responsive to the subscriber order data from the switch for producing video routing data. A file server, responsive to requests received from the video gateway, obtains selected video information from the digital information storage medium. A cross-connect switch in turn is responsive to the video routing data for transmitting the video information from the file server to the subscriber loop transmission means. Asymmetrical digital subscriber line interface (ADSL) units over a local loop carry the necessary signaling between the subscribers and information providers. The interface units frequency multiplex digital video information with voice information to the subscriber and support transmission of a reverse control channel from the subscriber to the central office for transmission back to the information provider.

U.S. Pat. Nos. 4,890,320 and 4,995,078, issued Dec. 26, 1989, and Feb. 19, 1991, respectively, to Monslow et al., describe programming-on-demand and impulse pay-per-view delivery systems that utilize at least in part the public switched telephone network. These patents disclose a television broadcast system for real-time transmission of a viewer chosen program at a viewer requested time for the requesting viewer's television receiver. The system comprises a program collection, which stores TV programs on a video tape. Each program is assigned and labeled with a catalog number. A viewer request is transmitted using a conventional telephone over the public switched telephone network to a scheduling computer. The chosen program is transmitted at the requested time over a broadband cable for viewing on the requesting viewer's television receiver. A control unit prevents other households connected to the cable from viewing the program.

U.S. Pat. No. 4,949,187, issued Aug. 14, 1990, to Cohen describes a video communications system comprising a remotely controlled central source of video and audio data. This system allows home viewers to select from a choice of movies or other video and audio data that may be transmitted from the central source to be stored at the viewer's premises. The viewer can play the selection at any convenient time of his choosing. The central source may store the data digitally. Movies that need to be frequently accessed are stored on disks. Movies that are accessed only infrequently are archived. A distribution system CPU controls the bi-directional flow of data from both types of drives. Several movies can be transmitted simultaneously to different viewers through a plurality of input/output controllers. To make use of a single transmission media, such as a telephone line, a multiplexer is used which may multiplex in the time domain or the frequency domain.

U.S. Pat. No. 4,381,522, issued Apr. 26, 1983, to Lambert, discloses a cable television system which includes a plurality of selectable video signal sources having suitable television program material. The system enables a viewer to select desired program material available by telephone at a remote location and have the selected material promptly available for viewing.

U.S. Pat. No. 4,888,638 issued Dec. 19, 1989, to Bohn, discloses a marketing research system for substituting stored TV programs for regularly scheduled, broadcast TV programs. The substitute TV programs may be transmitted from a central office via telephone lines to households of cooperating panelists for storage at the household premises.

More recently, several different wideband digital distribution networks have been proposed for offering subscribers an array of video services, including true video-on-demand service. The following U.S. patents disclose representative examples of such digital video distribution networks: U.S. Pat. No. 5,253,275 to Yurt et al.; U.S. Pat. No. 5,132,992 to Yurt et al.; U.S. Pat. No. 5,133,079 to Ballantyne et al.; U.S. Pat. No. 5,130,792 to Tindell et al.; U.S. Pat. No. 5,057,932 to Lang; U.S. Pat. No. 4,963,995 to Lang; U.S. Pat. No. 5,949,187 to Cohen; U.S. Pat. No. 5,027,400 to Baji et al. and U.S. Pat. No. 4,506,387 to Walter.

A high percentage of television service to residential customers is now provided by coaxial cable delivery networks (CATV). CATV provides broad bandwidth and it is the expressed intention of cable television operators to provide local telephone service over their existing cables. At the same time, wireless or radio links are providing co-called wireless cable TV, as well as satellite delivery of television and data communication signals. In addition, the interexchange or long distance telephone carriers have expressed an intent to supply local connectivity for their interexchange services, thereby eliminating their need to connect through local exchange carriers and their local loop.

In this competitive context it would seem probable that at least some existing local exchange carrier (LEC) local loops may become unused or under used. As a consequence it would be desirable and advantageous to LEC's to provide an alternate usage for such links and an effective and economical method for measuring usage for billing purposes. It is accordingly an object of the present invention to provide an arrangement and method for utilizing portions of the existing public switched telephone network for alternate purposes, while efficiently and conveniently providing a method of measuring the usage of such circuits for billing purposes.

DISCLOSURE OF THE INVENTION

According to the invention there is provided an arrangement wherein one or more telephone company local loops to subscriber premises may be utilized in whole or in part for providing to such premises a connection to the service platform of a third party alternate service provider. The alternate service provider may be another local telephone company, an interexchange carrier, a video service provider, a multi-media service provider, or the like. The use of the local loop is leased to the third party service provider at a rate dependent upon the usage and nature of usage of the circuit.

Information and data to permit efficient and convenient billing for leased usage of such loops is implemented by providing on the local loop a passive monitor. The monitor detects and temporarily stores data relating to the commencement and termination of signaling, the time of day, and the nature of the signaling that occurs. Thus, charges may be dependent not only upon the time duration of signaling, but also on the rate of information transferred.

Data collected from the monitors is stored at a monitor center from which it is transferred to a billing operation such as the telephone company Revenue Accounting Office (RAO). In the process of transfer of the information to the RAO it may be expedient to store the information in a convenient switch journal for transfer to the RAO over existing switch journal to RAO links.

The data may be transferred from the monitors to the central storage through varying known procedures. The monitors are provided with identifying indicia, such as numbers, and are preferably provided with a buffer memory for temporarily storing data. The central storage includes a processor and can periodically sweep or scan the monitors to collect the data. Alternatively the monitors, which also include a microprocessor and clock, may periodically transmit or download their identification and data to the monitor center storage. As a still further alternative the monitors may download data on a real time basis. According to one feature of the invention the data may be collected from the monitors through the use of the existing LEC common channel signaling system.

It is another feature of the invention that the monitors may be implemented as a part of a monitor-switch module. This module provides the option of connecting the local loop which extends to the customer premise to either the third party service provider or to an end office telephone company switch. This permits the possibility of part-time leasing of the loop or of simultaneous loop usage by the third party service provider and the telephone company. The latter usage is possible using non-interfering signaling modes by the two parties. Control of the necessary switching may be implemented without the necessity of additional wiring by using non-interfering in-band signaling.

It is another feature of the invention that the link between the monitors and the monitor center for providing the monitor data to the monitor center may take multiple forms. According to one preferred embodiment of the invention, where a local loop is broken or disconnected remote from the end office or monitor center, the link to the monitor center may be provided by using that portion of the disconnected loop which formerly was connected to the switch for serving the telephone terminal in the customer premise. The other portion of the disconnected loop which extends to the customer premise is then connected to the alternate service provider's line to the service platform of such provider. The monitor is coupled to the loop at this location and the data connection of the monitor to the monitor center is made via the portion of the former local loop extending to the end office. As an alternative, separate links may be provided to connect the monitors to the monitor control center. As a still additional alternative, wireless or radio links may be utilized between the monitors and the monitor control center.

According to another embodiment of the invention the capabilities of the common channel signaling system and an Advanced Intelligent Network (AIN) are utilized in the information handling. In this version the monitors communicate with a Signal Switching Point (SSP) by delivering to such SSP a dialed number. The dialed number contains information regarding the commencement or termination of the usage of an identified local loop and an identification of the nature of such usage. This dialed number triggers the SSP to formulate a message which may preferably utilize the protocol known as Transaction Capabilities Application Part (TCAP) which contains the information delivered to the SSP by the dialing. The SSP sends this TCAP message via one or more Signal Transfer Points (STPs) to a Service Control Point (SCP). The SCP contains the usual database of enhanced subscriber services which are accessed and controlled by a Service Logic Program (SLP). In this particular embodiment the SCP also contains a database for storing and processing the information handled in the monitor control center of the preceding embodiments of the invention. The SCP gathers and stores the usage information and periodically downloads such information to a billing office such as the Records Accounting Office (RAO) for billing to the alternate service provider and/or customer as may be arranged between the contracting parties.

BRIEF DESCRIPTION OF DRAWINGS

The invention will be understood and its numerous objects and advantages will become more apparent to those skilled in the art by reference to the following drawings, in conjunction with the accompanying specification, in which.

BEST MODE FOR CARRYING OUT THE INVENTION

Figure 1:
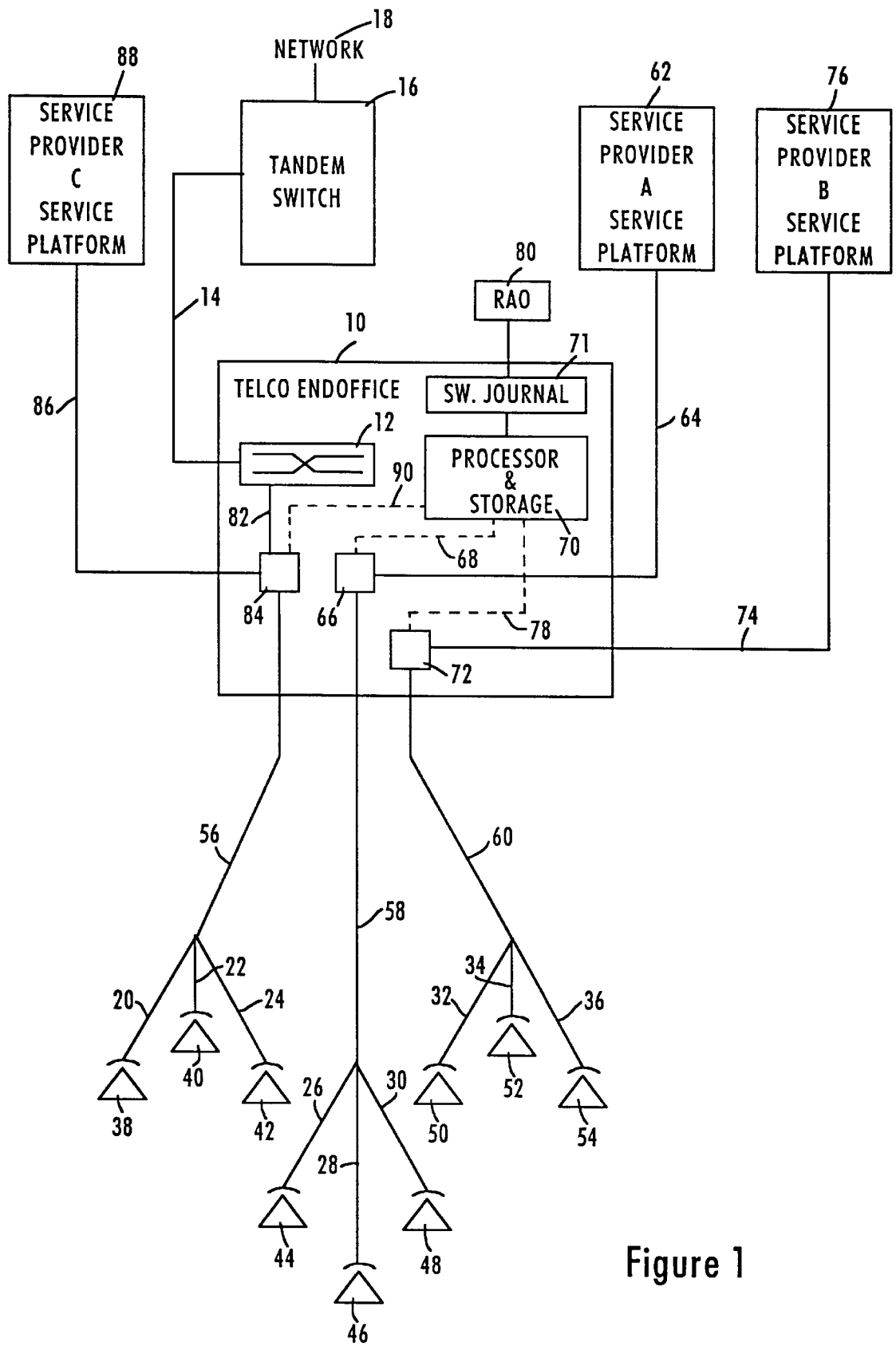
FIG. 1 is a simplified block diagram illustrating an arrangement to provide leased access of local loops in a switched telecommunications network to third party providers including an arrangement for monitoring, measuring and billing for usage of such leased circuits.

FIG. 1 is a simplified block diagram illustrating an arrangement to provide leased access to local loops in a switched telecommunications network to third party providers. The illustrated arrangement includes a system for monitoring, measuring and billing for such usage of the leased circuits on the basis of both the amount and nature of such usage.

Referring to FIG. 1 there is shown an end office 10 of a local exchange carrier (LEC), which could be either a Regional Bell Operating Company (RBOC) or an independent telephone company which provides local telephone and related services. The LEC end office 10 typically includes a program controlled switch shown at 12. Such a switch may be a 5ESS switch manufactured by AT&T or equivalent switches available from other manufacturers. The switch 12 is connected by a suitable trunk 14 and tandem switch 16 to the telecommunications network indicated generally at 18. In its original capacity as an LEC end office switch the switch 12 provided connection to a series of local loops 20–36 connected to telephone terminals 38–54. For convenience of illustration the local loops 20, 22 and 24 are shown in the form of a cable 56 and the remaining local loops are shown as cables 58 and 60.

Figure 2:
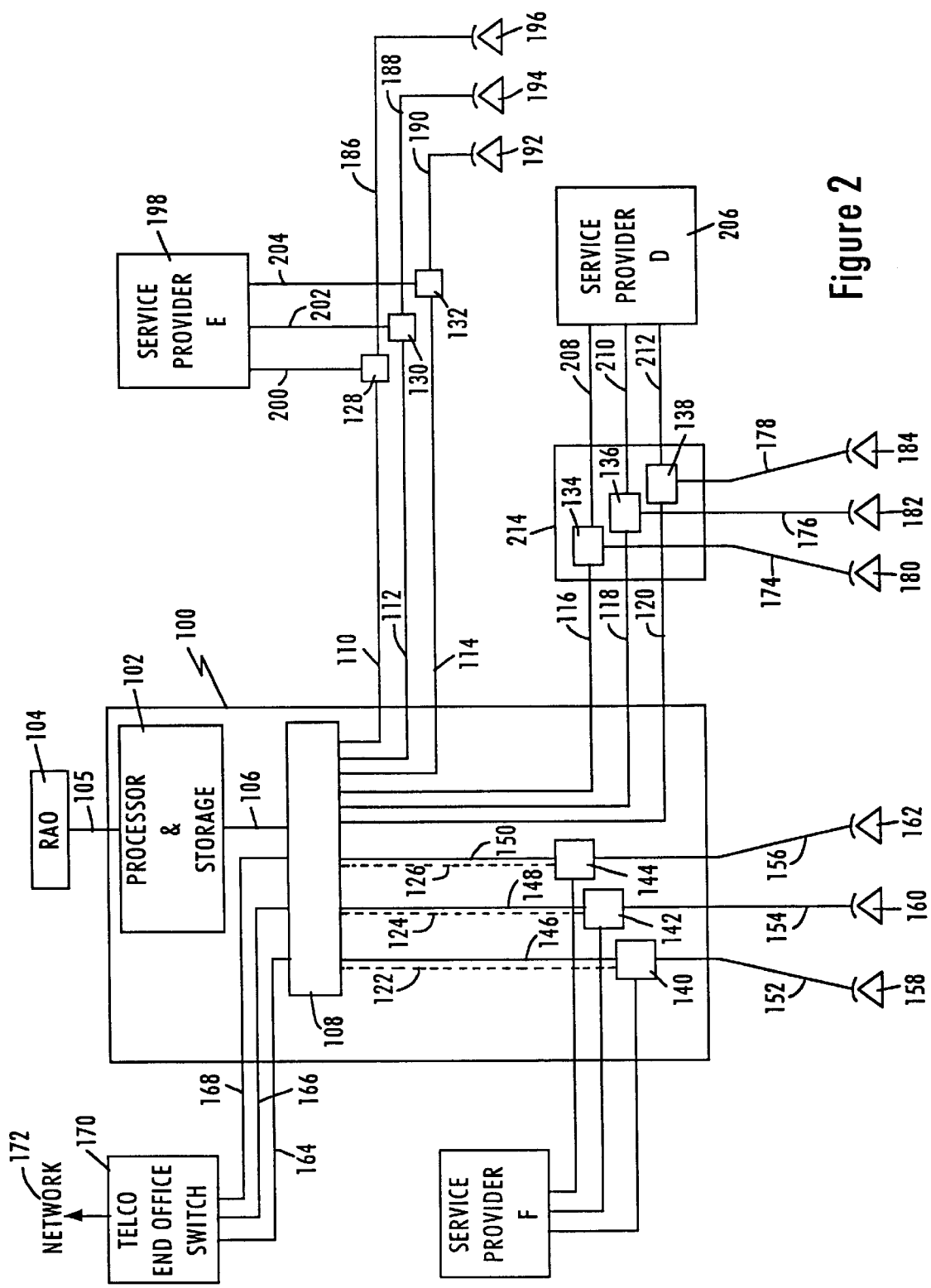
FIG. 2 is a simplified block diagram illustrating another arrangement to provide leased access of local loops in a telecommunications network to third party providers including an arrangement for monitoring, measuring and billing for usage of such leased circuits.
Figure 4:
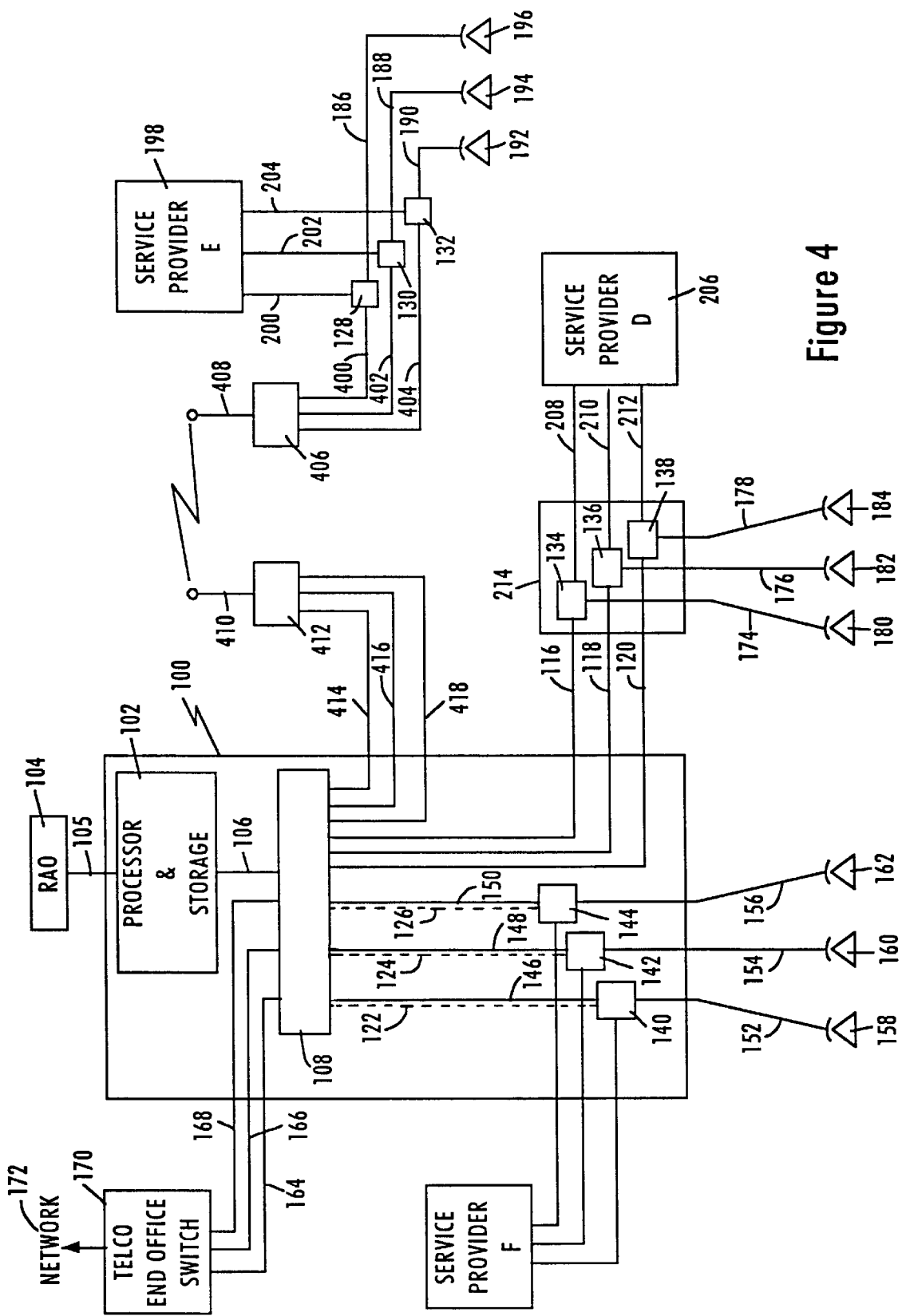
FIG. 4 is a simplified block diagram illustrating still another arrangement to provide leased access of local loops in a switched telecommunications network to third party providers including an arrangement for monitoring, measuring and billing for usage of such leased circuits.

It will be appreciated that these local loop connections are conventionally made and disconnected at the distribution frame. The frame is illustrated in FIGS. 2 and 4 but is not specifically shown in FIG. 1. The local loops have customer premise ends, which are connected to customer premise equipment (CPE), and telephone company (Telco) ends. The Telco ends normally terminate in the Telco central office which constitutes the end office for the loops. However, as further discussed herein, different sites for termination may be provided. The end office switch connections to the Telco ends of local loops are made via the distribution frame, which is also the terminus for the lines which make the actual switch connection. When a particular loop terminating at the distribution frame is disconnected from the switch, this disconnect commonly occurs via jumpers at the distribution frame. Thus local loop terminations at the central office remain on the distribution frame, as do switch connections. However, when the local loop terminations are disconnected from the switch connections at the distribution frame, this normally occurs by disconnecting the jumpers which formerly completed the connection.

According to the invention the local loops 44, 46 and 48, shown cabled at 58, are leased to an alternate service provider A. Service provider A has a service platform 62 connected to the loops 44, 46 and 48 through an alternate service provider owned cable 64 to the LEC owned cable 58 which feeds the terminals 44, 46 and 48. The connection is made through a monitor 66. The connection through the monitor may be of a series nature such that the service provider signal passes through the monitor or, alternatively, the monitor may be inductively or otherwise coupled to the line carrying the service provider signal.

The monitor shown as a single element at 66 actually comprises separate monitor units for each of the local loops 26, 28 and 30 for monitoring the individual usage of those loops, as presently described in greater detail. The individual monitor units in monitor 66 are connected via a data link or links 68 to a processor and storage 70. In similar fashion the local loops 32, 34 and 36 are connected through cable 60, monitor 72 and cable 74 to yet another service provider B at that service provider's service platform 76. The monitor 72 again comprises three individual units for the separate loops 32, 34 and 36. These units are connected via a data link or links 78 to the monitor center processor and storage 70.

Local loops 26–30 and 32–36 are leased to service providers A and B for charges based on usage and nature of usage, i.e., voice band, broadband, data rate, etc. It is anticipated that the lease agreements would identify the nature of usage intended and specify use rates for the particular type of service. This would permit the usage monitors indicated at 66 and 72 to be designed for measuring the intended usage. On the other hand, more universal monitors may be utilized if this should prove advantageous.

The monitor units are connected by data links 68 and 78 to the processor and storage 70. This unit compiles a database of identified per loop cumulative usage by duration, time of day and nature of usage. For example, each monitor can mark the time of initiation of usage of its link, the time of day, the frequency, data rate, and bandwidth of use and the time of termination of that usage. The frequency, data rate and bandwidth utilized may change during usage and this is duly recorded in the processor and storage 70. The processor and storage 70 periodically formulate and transmit summary reports of link usage by customer to the switch journal 71 and from there to an appropriate billing entity such as the Revenue Accounting Office (RAO) 80. At the end of each month the records accounting office may compile and submit bills to the respective customers for their usage of the leased links.

Referring to the left-most illustrative telephone terminals 38–42 served by the LEC end office switch 12, this set of loops is shown connected to the switch 12. However, the loops may also be leased on a full or part-time basis to an alternate service provider. When the loops 20–24 are served by the LEC switch 12, the cable 56 is connected to the switch at 82. However, the cable 56 is connected to cable 82 through a combined monitor and switching module 84 described in detail hereinafter in connection with FIG. 3. The monitor in the combined module 84 provides a connection 86 to a the third alternate service provider C at that provider's service platform 88. The switch and monitor module 84 is also connected via data link 90 to the processor and storage unit 70.

This arrangement provides several options. The LEC may provide plain old telephone service (POTS) to the telephone terminals 38–42, while granting to the service provider C a lease to use the local loops 20–24 for non-conflicting or non-interfering service. Such service may be in a frequency band separated from the conventional 4,000 KHz band utilized by the voice signal. That service usage can be monitored via the monitor unit 84 and billed by the RAO as previously described. At the same time the LEC may provide its own POTS service to one or more of the terminals 38–42. It will be understood that simultaneous service by the third party alternate service provider terminates in a terminal other than the POTS or other telephone served by the LEC. Such a terminal may be a video, facsimile, printer, or the like. The monitor module 84 contains separate sub-units for the individual loops 20–24 as previously described.

Alternatively to the foregoing, service provider C may lease one or more of the loops 20–24 on an as needed basis at such times as the loop can be seized in an on-hook condition. As a still further alternative, service provider C may choose to lease the entire capacity of the loops either on a demand basis or at specified times of day. In this situation the loops are disconnected from the switch during the time of use by the alternate service provider. A central office controlled switch may be provided at or adjacent to the switch 12 for this purpose.

Referring to FIG. 2 there is shown another preferred embodiment of the invention. While the connections between the alternate service providers and the local loops are shown as being made within an LEC end office in the embodiment in FIG. 1, it is not necessary that these connections be concentrated. In FIG. 2 there is shown an embodiment of the invention wherein alternate service providers connect to their leased local loops at distributed sites. In this embodiment a monitor center 100 may be located at any convenient site. The monitor center houses the processor and storage 102 which is connected to the revenue accounting office (RAO) 104 via a suitable link 105.

Figure 3:
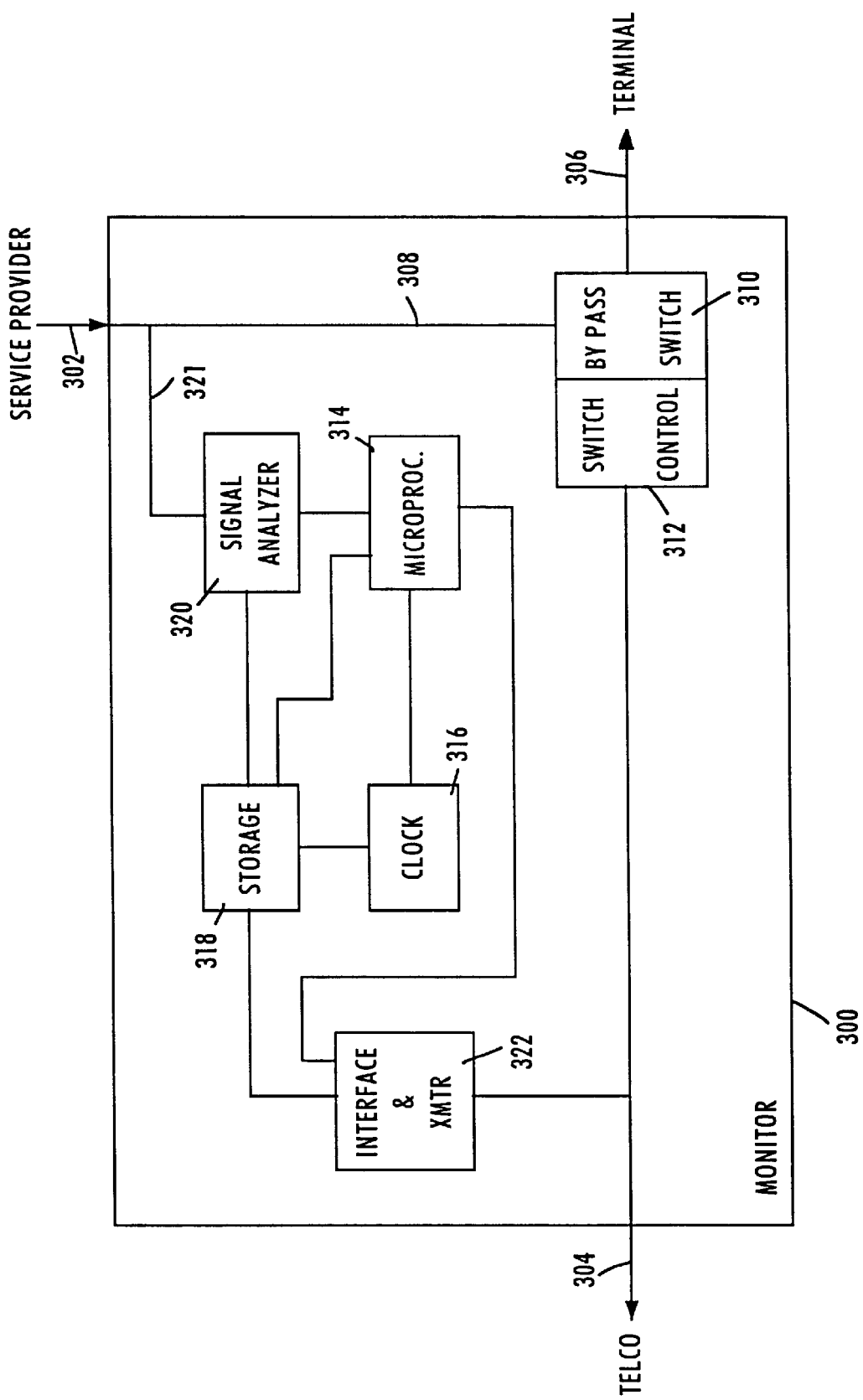
FIG. 3 is a simplified block diagram of a monitor-switch module suitable for use in the system and method of the invention.

The processor and storage 102 is connected by a data link or links 106 to a connection or distribution frame 108 for connection to the monitor leads 110–126. These monitor leads in turn are connected to outdoor mounted monitors 128–132, vault mounted monitors 132–136, and monitor center mounted monitors 140–144. The monitor center monitors 140–144 constitute the individual monitors in a monitor module such as the monitor module 84 in FIG. 1 and the module 300 illustrated in FIG. 3, presently to be described. These units perform both monitor and switching functions. Monitors 140–144 are connected to the distribution frame 108 not only by data links 122–126 shown with broken lines, but also by local loop lines shown as solid lines at 146–150. These local loop lines provide connection through the monitor-switch units 140–144 to the outdoor local loops 152–156 which terminate at telephone terminals 158–162. The local loops 152–156 are connected through the distribution frame 108 to lines 164–168 to the LEC end office switch 170. The switch 170 in turn is connected to the switched telephone network indicated generally at 172.

The second set of monitors 134–138 is not mounted in the monitor center 100 but in an externally located site 214. Monitors 134–138 connect local loops 174–178 to service provider D at 206 via lines 208–212. By way of example, the monitors 134–138 may be housed in a controlled environmental vault (CEV) 214. The monitors 134–138 are connected to the distribution frame 108 by loop lines 116–120.

The third group of monitors 128–132 is outdoor mounted and may be overhead, pedestal or otherwise mounted. The local loops 186–190 connect the premises housing telephone terminals 192–196 to alternate service provider E. The monitors 128–132 may be exterior units mounted singly or in clusters on overhead structures.

It is a feature of the invention that the monitor connections to the distribution frame 108 may be made through the use of the conductors which previously served as portions of the local loops from the end office switch serving the original telephone terminals. This is particularly applicable to the outdoor monitors 128–132 and the CEV monitors 134–138. This use of the disconnected local loop leads facilitates implementation of distributed connections to the alternate service providers and distributed monitoring. When this is done there is no need to locate or install separate monitor data collector leads from the monitors to a monitor center. The installation is facilitated in that the technician making the monitor connection needs only to break the existing local loop, connect the telephone terminal end to the alternate service provider, and connect the former switch end to the data terminals on the monitor. The monitor is either inductively coupled to the leased loop portion, inserted in series therewith, or bridged onto that portion of the local loop. The monitor center may conveniently be sited proximate an LEC network switching office for ready connection to the network.

It is possible to use these existing local loop leads which are now connected to the monitor center to serve combination monitor-switch modules such as units 140–144 by conducting the necessary switch control via in-band signaling over the loop. Such signaling may be used not only from the monitors to the processor and storage 102 but also over the connection to the alternate service providers. This permits the alternate service providers to also maintain a running compilation of individual line usage where this is desired.

Referring to FIG. 3 there is shown a simplified block diagram of an illustrative monitor-switch module which may be used in the system of the invention. The monitor-switch module 300 is connected to its alternate service provider at 302, to the LEC end office at 304, and to the external loop and customer premise terminal at 306. The service provider connection at 302 continues in module 300 as line 308. Line 308 is connected to a bypass switch module which comprises a switch 310 and a switch control 312. The switch control and switch are also connected to the LEC line 304 which goes to the LEC switch (not shown), and to the customer terminal line 306 and to the local loop to which it is connected.

When the local loop 306 is leased by the service provider on a full time basis the switch 310 connects the terminal and loop line 306 directly to the incoming service provider line 308. The terminal and loop line 306 are then disconnected from the LEC switch line 304. If the contrary situation exists where the LEC is serving the loop and telephone terminal on a full time basis, the converse is true. The loop 306 is then directly connected to the LEC line 304 and is disconnected from the service provider lines 308 and 302.

The condition of the switch 310 may be controlled by the LEC by in band signaling to the switch control 312 over the line 304. If desired, the LEC may provide for shared usage of the loop 306 and permit the service provider 302 the ability to control the switch by similar inband signaling over the service provider line 308. A contention situation may exist at the switch 310 which may be handled by conventional busy signal protocols or a similar arrangement. The agreement between the LEC and the alternate service provider may obviously establish the conditions for solving such contention situations. The availability of this type of switching can also be used to permit the service provider access to the LEC switched network under agreed conditions.

The monitor module 300 also contains a microprocessor 314, clock 316, storage 318, signal analyzer 320, and interface and transmitter or modem 322. The microprocessor controls the signal analyzer, storage and transmitter or modem. The signal analyzer 320 is connected to the incoming service provider signal via connection 321 and provides an output which indicates the presence or absence of a service provider signal, the nature of the signal, the baud rate or rate of information transfer, and other details of the signal where desired. Such analyzers are well known in the art and in an illustrative embodiment may take the form of the analyzer manufactured by Advanced Electronic Applications, Inc. under their model number PK-232MBX.

The output of the signal analyzer 320 is periodically connected to the storage 318 under control of the microprocessor and such output is recorded along with the time of each entry. This provides in the storage 318 a database of usage which shows the time and duration of usage and the nature of the signal or signals being carried. This data is periodically transferred to the processor and storage 70 or 102 of the LEC for billing purposes as previously described in connection with FIGS. 1 and 2.

It is also a feature of the invention that billing information may be supplied directly to the service provider for purposes of the service provider billing its own customers. Such billing information may be supplied by the LEC either from the RAO via the telephone network or, as an alternative, the microprocessor in the monitor may be programmed to effect a connection from the transmitter or modem 322 to the providers line 308 through the switch 310 for transfer direct to the service provider by suitable signaling over that line. If desired by the service provider the monitor may also be arranged to monitor the identity of the channel being delivered to the subscriber over the loop. If such a feature is desired the monitor may be provided with the added feature of making such an identification in the manner shown by way of example in the monitor described in U.S. Pat. No. 4,893,248, issued Jan. 9, 1990 to Pitts et al.

Referring to FIG. 4 there is shown yet another embodiment of the invention wherein the link between the monitors and the monitor center is provided in a wireless fashion by a suitable radio connection. FIG. 4 shows an embodiment of the invention similar to that shown in FIG. 2 with the exception of the link provided between the monitors 128–132 for service provider E and the monitor center 100. According to this feature of the invention the data connection to the monitors 128–132 is fed via lines 400, 402 and 404 to a suitable multiplexer, modulator and transmitter 406. An antenna 408 radiates the modulated carrier, preferably at a frequency in the VHF band or above. This signal is received by a receiving antenna 410 of a receiver, demodulator and demultiplexer 412. From the unit 412 the demultiplexed signals are fed via leads 414, 416 and 418 to the distribution frame 108 and from there via the link 106 to the processor and storage 102. The transmitter, modulator, multiplexer and receiver, demodulator and demultiplexer may be of any suitable type well known to those skilled in the art and may, for example, be of the type described in detail in U.S. Pat. application Ser. No. 08/405,685 filed Mar. 17, 1995, and co-assigned with the present invention.

Modern telecommunications systems offer subscribers a large number of enhanced subscriber services and are increasingly implementing these services through the use of a common channel signaling system known as the Advanced Intelligent Network (AIN).

Figure 5:
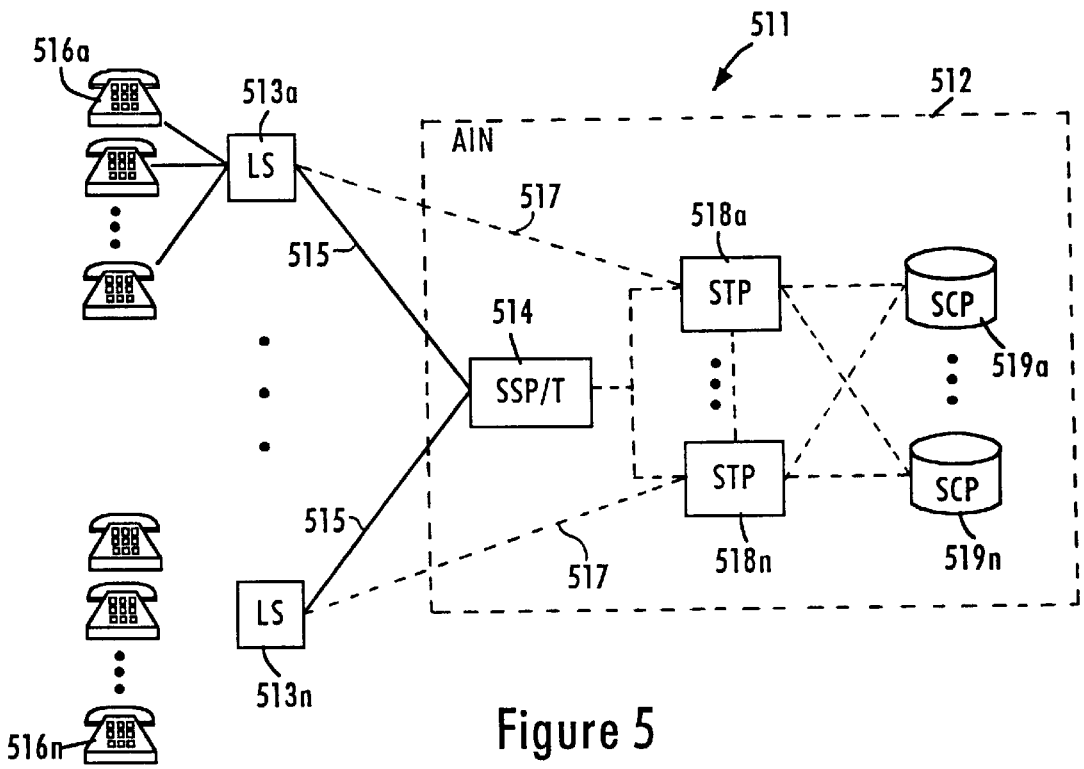
FIG. 5 is a simplified block diagram of a typical telecommunications system using common channel signaling in the form of an Advanced Intelligent Network (AIN) to provide enhanced subscriber services.

FIG. 5 is a simplified block diagram of a typical telecommunications system 511 using an Advanced Intelligent Network (AIN) 512 to provide enhanced subscriber services. The AIN 512 and its associated Signaling System Number 7 (SS7) protocol are described in the industry standard, "TR-NWT-000246, Bell Communications Research Specification of Signaling System Number 7," which is hereby incorporated by reference. A large number of Local Switches (LSs) or End Office Switches (EOs) 513*a–n*, which are not ISUP capable, may be connected to a Service Switching Point/Tandem (SSP/T) 514 via multi-frequency (MF) links 515. "Tandem", as used herein, may be a local, LATA, or access tandem. The LSs 513*a–n* provide connections for subscribers 516*a–n* into the telecommunications system or network 511. The AIN 512 uses a system of high speed telecommunications links known as a Common Channel Signaling (CCS) network which employs the standard SS7 signaling protocol to link all of the components of the AIN 512. Standard telephony diagrams, and all figures herein, indicate links utilizing the SS7 signaling protocol as dotted lines and MF trunks as solid lines.

The components of the AIN 512 may include the SSP/T 514, one or more Signal Transfer Points (STPs) 518a–n which act as intermediate switching nodes, and one or more Service Control Points (SCPs) 519a–n. The SCPs 519 each contain a database of enhanced subscriber services which are accessed and controlled by a Service Logic Program (SLP). The SCP 519 currently utilizes a standardized protocol known as Transaction Capabilities Application Part (TCAP) for coordination of functions. The current version of the protocol required for communication with the SCP 519 is TCAP/AIN Release 0.1. The SCP 519 is described in the Bellcore standard, "TA-NWT-001280, Advanced Intelligent Network (AIN) Service Control Point (SCP) Generic Requirements," which is hereby incorporated by reference. The SCP 519 acts as a repository for enhanced subscriber services which may be accessed by any one of the LSs 513a–n. In the past, each LS had to be individually upgraded with enhanced subscriber services. With the implementation of the AIN 512, and the required communications capabilities in the LSs, new enhanced services need only be added to the SCP 519.

Figure 8:
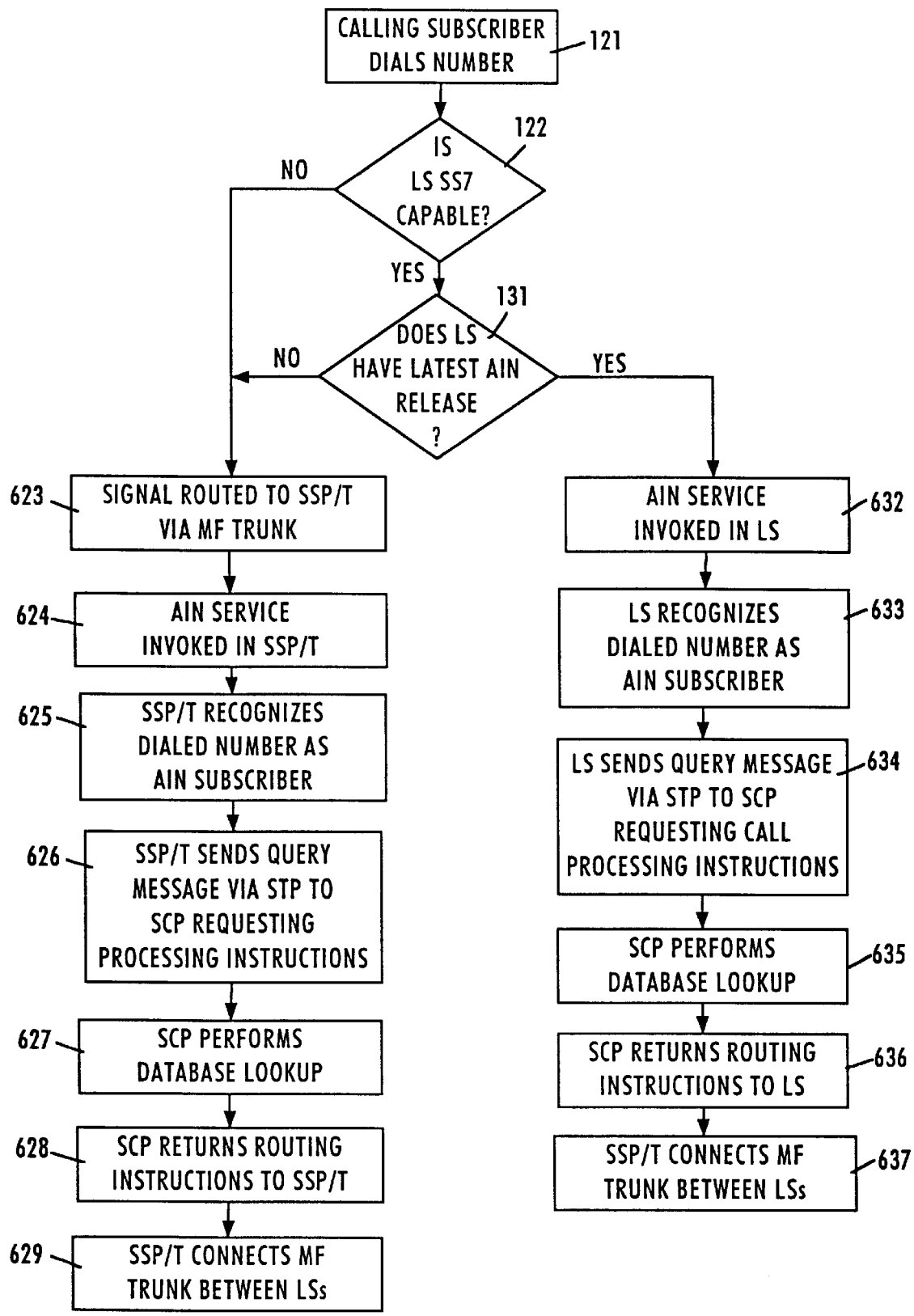
FIG. 8 is a flow chart illustrating the message flows involved in determining the type of access provided for different LSs or EOs, and in the method of service retrieval, from a database stored in a Service Control Point (SCP).

LSs 513 which have been upgraded to communicate utilizing the SS7 signaling protocol, and the latest release of the TCAP/AIN communications protocol, may communicate directly with an STP 518 and from there with an SCP 519 or other SSP/Ts, utilizing the high speed CCS network. LSs 513 which have not been upgraded with SS7 signaling capability, or with the TCAP/AIN communications protocol, must communicate over lower speed MF trunks 515 with the SSP/T 514 which, in turn, utilizes the SS7 signaling protocol, the TCAP/AIN communications protocol, and the CCS network to communicate with the STPs 518 and the SCPs 519. Dependence on MF trunks for access to the AIN 512 can substantially lengthen the time required to retrieve subscriber services, and ties up an expensive MF trunk which remains open and occupied during the retrieval period. The message flow utilized to retrieve an enhanced subscriber is described in more detail in conjunction with FIG. 8 below.

Another transaction often carried out utilizing the CCS network is call setup. Call-setup messages utilize a call-setup protocol known as the Integrated Services Digital Network (ISDN) User Part (ISUP) call-setup protocol. The ISUP call-setup protocol is described in the Bellcore standards, "TR-NWT-000317. Switching System Generic Requirements for Call Control Using the Integrated Services Digital Network User Part (ISDNUP)", "TR-NWT000394, Switching System Generic Requirements for Interexchange Carrier Interconnection Using the Integrated Services Digital Network User Part (ISDNUP)", and "TR-NWT000444, Switching System Requirements Supporting ISDN Access Using the ISDN User Part", which are hereby incorporated by reference.

Figure 6:
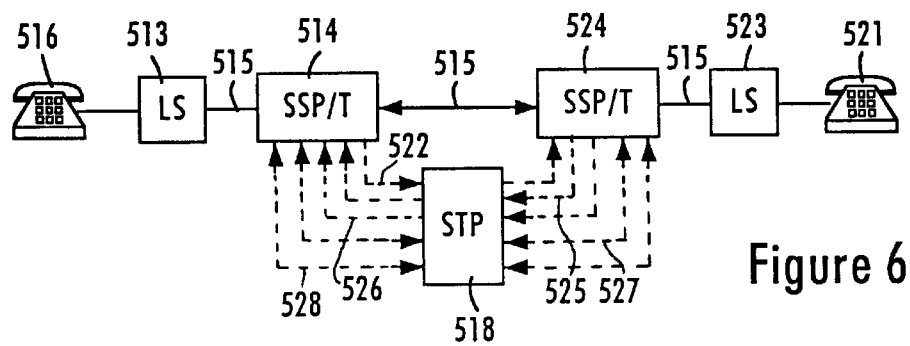
FIG. 6 is a simplified block diagram illustrating a typical message flow utilized for call setup between two local telephone switches (LSs) or end offices (EOs) which have not been upgraded to utilize the Integrated Services Digital Network User Part (ISUP) call-setup protocol, i.e., are not SSP capable.

FIG. 6 is a simplified block diagram illustrating a typical message flow utilized for call setup between two local telephone switches (LSs) 513 and 523 which have not been upgraded to utilize the ISUP call-setup protocol. Each non-ISUP LS is typically connected through a MF trunk 515 to an associated SSP/T. Thereafter, a series of ISUP messages is sent back and forth between an originating SSP/T 514, associated with a calling subscriber 516, and a destination SSP/T 524, associated with the called subscriber 521. The ISUP messages during call setup include an Initial Address Message (IAM) 522, an Address Complete Message (ACM) 525, an Answer Message (ANM) 526, a Release Message (REL) 527, and a Release Complete Message (RLC) 528. The ISUP messages are routed via the STP 518.

Figure 6A:
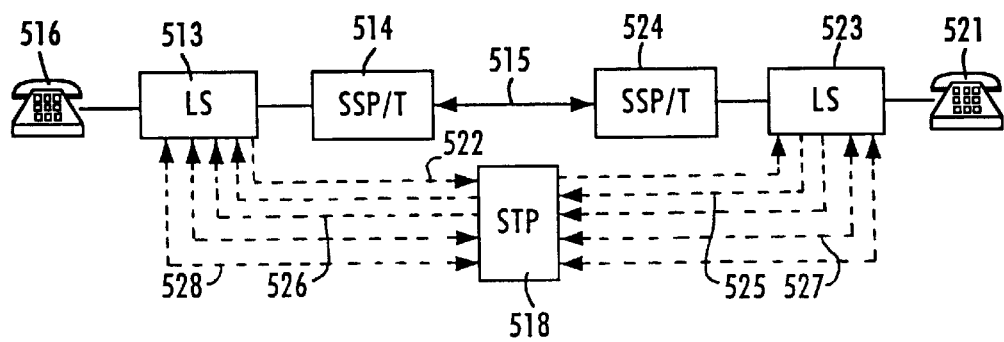
FIG. 6A is a simplified block diagram illustrating a typical message flow utilized for call setup between two LSs or EOs which have been upgraded to utilize the ISUP call-setup protocol and are SSP capable.

Many LSs in use today have been upgraded to utilize the ISUP call-setup protocol. FIG. 6a is a simplified block diagram illustrating a typical message flow utilized for call setup between two local telephone switches (LSs) 513 and 523 which have been upgraded to utilize the ISUP call-setup protocol. This upgrade allows ISUP-capable LSs to bypass the MF trunk link to the SSP/T, and communicate directly through the STP 518. Thus, the LS may perform call setup entirely over the CCS high speed telecommunications network. The CCS network is capable of transmitting at much higher data rates than multi-frequency (MF) trunks, and call setup can be completed over the CCS network much faster and more efficiently than in the past.

When utilizing the SS7 signaling protocol and the ISUP call-setup protocol for call setup, out-of-band signaling messages replace Multi-frequency (MF) and other in-band interoffice signaling mechanisms on selected circuits. The out-of-band messages are used to report circuit seizure and to transport address information, answer supervision, circuit release, etc. Thus, the network use of the SS7 signaling protocol for circuit-switched call connection and release differs fundamentally from traditional in-band circuit signaling. Instead of sending information on the facilities used for subscriber-to-subscriber communication, the switching system sends signaling information via a separate signaling network. The SS7 signaling protocol thereby allows switching systems to exchange information related to a circuit-switched connection even when the circuit is in the conversation mode.

Figure 7:
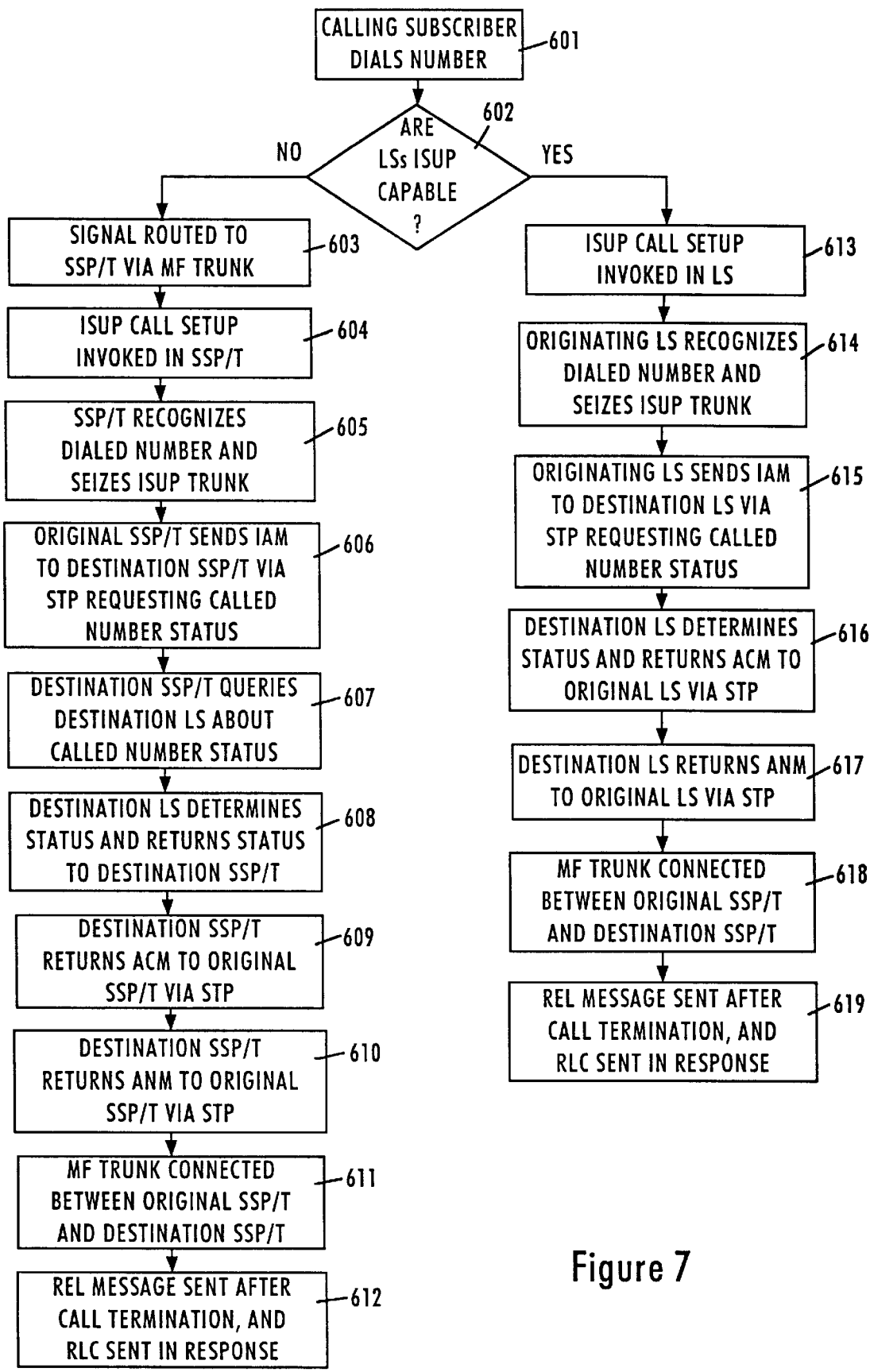
FIG. 7 is a flow chart illustrating the typical message flows involved in setting up a call via the ISUP call-setup protocol, for both non-ISUP and ISUP-capable LSs or EOs.

FIG. 7 is a flow chart illustrating the typical manner in which a call is set up via the ISUP call-setup protocol, for both non-ISUP LSs and ISUP-capable LSs. At step 601, a calling subscriber 516 (FIGS. 6 and 6a) dials the telephone number of a distant subscriber 521. At step 602, if the LSs are not ISUP-capable, the call is routed over MF trunks to an originating SSP/T 514 at step 603. At step 604, ISUP call setup is invoked in the SSP/T 514 which then recognizes the dialed number as a number which requires ISUP routing, and seizes an ISUP trunk at 605. At 606, the originating SSP/T 514 then utilizes the ISUP call-setup protocol to send an Initial Address Message (IAM) 522, via the STP 518, to a destination SSP/T 524, asking for the status of the dialed subscriber's phone 521. At step 607, the destination SSP/T 524 queries the destination LS 523 about the status of the called subscriber's phone 521. The destination LS 523 determines the status of the called subscriber's phone 521, i.e., busy, idle, forwarded, out of service, etc., at step 608, and returns this status to the destination SSP/T 524. At 609, the destination SSP/T 524 returns, via the STP 518, an Address Complete Message (ACM) 525 to the originating SSP/T 514, containing the status of the called subscriber's phone 521. The originating SSP/T 514 receives the ACM 525 and at step 610, the destination SSP/T 524 returns, via the STP 518, an Answer Message (ANM) 526 to the originating SSP/T 514 indicating that a MF trunk should be set up between the two SSP/Ts 514 and 524. At step 611, the MF trunk 515 between the originating SSP/T 514 and the destination SSP/T 524 is connected thereby providing speech capability between the calling subscriber 516 and the called subscriber 521. Once the call is terminated at step 612, a Release Message (REL) 527 is sent from the switch serving the first subscriber to hang up, to the switch serving the other subscriber. In response, a Release Complete Message (RLC) 528 is returned.

If, however, at step 602 it was determined that the LSs are ISUP-capable, then the message flow moves to step 613 where ISUP call setup is invoked in the originating LS 513. The originating LS 513 recognizes the dialed number as a number which requires ISUP routing and seizes an ISUP trunk at 614, and at 615 sends an IAM 522 to the destination LS 523 via the STP 518 requesting the status of the dialed subscriber's phone 521. At 616, the destination LS 523 determines the status of the dialed subscriber's phone and returns an ACM 525 to the originating LS 513 containing the status. At step 617, the originating LS 513 returns an ANM 526 indicating that a MF trunk should be set up between the two SSP/Ts 514 and 524. At step 618, the MF trunk 515 between the originating SSP/T 514 and the destination SSP/T 524 is connected thereby providing speech capability between the calling subscriber 516 and the called subscriber 521. Once the call is terminated at step 619, a REL 527 is sent from the switch serving the first subscriber to hang up, to the switch serving the other subscriber. In response, a Release Complete Message (RLC) 528 is returned.

Figure 7A:
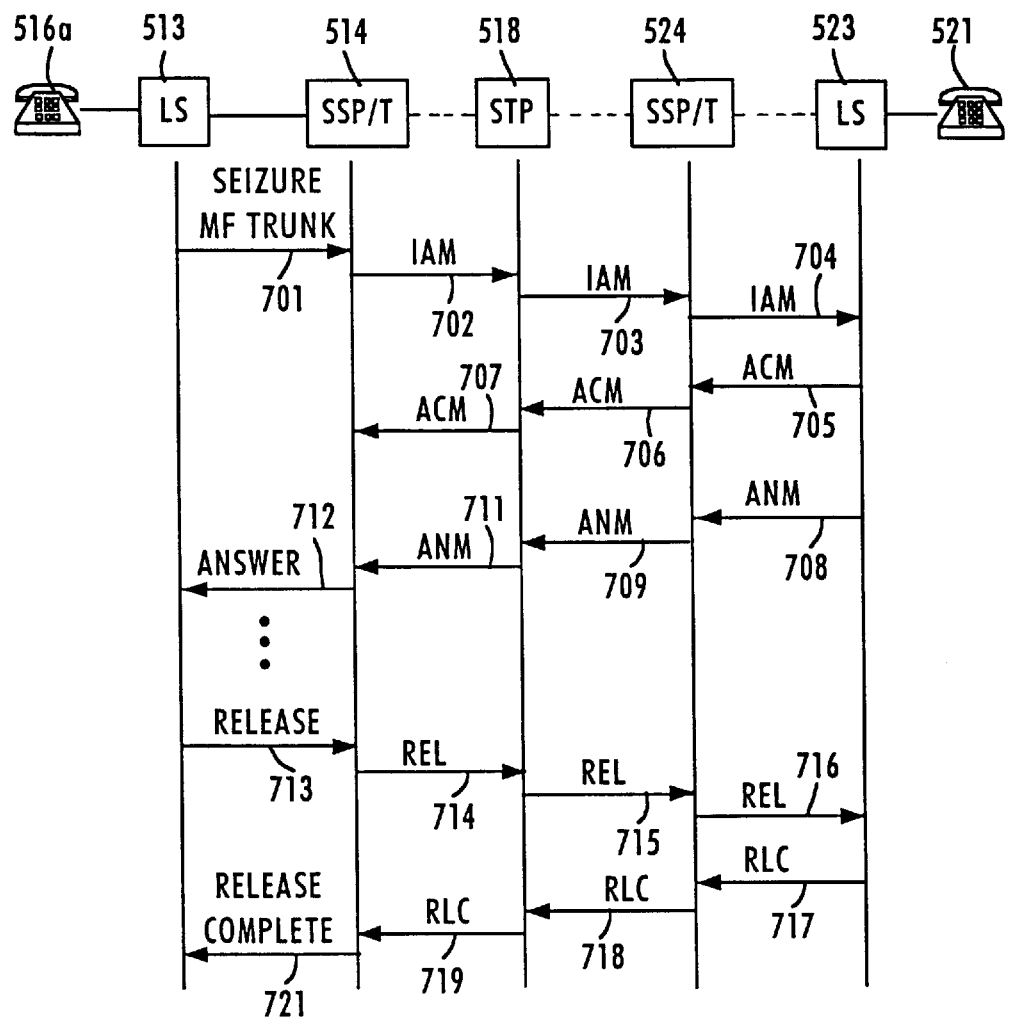
FIG. 7A is a message flow diagram illustrating the flow of messages from a non-ISUP LS to an ISUP-capable LS during call setup and call release.

FIG. 7a is a message flow diagram illustrating the flow of messages from a non-ISUP LS 513 to an ISUP-capable LS 523 during call setup and call release. At 701, the non-ISUP LS 513 seizes an MF trunk to the SSP/T 514. At 702, the SSP/T 514 sends an Initial Address Message (IAM) to the STP 518 which forwards it to the SSP/T 524 serving the called subscriber 521. At 704, the IAM is sent to the ISUP-capable LS 523 serving the called subscriber 521.

An Address Complete Message (ACM) is returned to the SSP/T 524 at 705. At 206, the ACM is sent to the STP 518 where it is forwarded to the SSP/T 514 at 707. An Answer message (ANM) is returned from the LS 523 to the SSP/T 524 at 708. At 709, the ANM is sent to the STP 518 where it is forwarded to the SSP/T 514 at 711. At 712, an answer signal is sent over the MF trunk to the non-I SUP LS 513.

Termination of the call is begun after the first subscriber hangs up (in this example, subscriber 516a). At 713, a release signal is sent over the MF trunk from the non-ISUP LS 513 to the SSP/T 514. A Release message (REL) is sent from the SSP/T 514 to the STP 518 at 714 which forwards the REL to the SSP/T 524 at 715. At 716, the REL is received by the LS 523 which returns a Release Complete Message (RLC) to the SSP/T 524 at 717. At 718, the SSP/T 524 sends the RLC to the STP which forwards the RLC to the SSP/T 514 at 719. At 721, a release complete signal over the MF trunk results in the disconnection of the call.

Referring again to FIG. 5, it can be seen that LSs 513a–n may access the AIN 512 either through MF trunks 515 and the SSP/T 514, or directly through SS7 links 517 to the STP 518. The message flow involved in determining the type of access, and in the method of service retrieval from the database in the SCPs 519, is shown in the flow diagram of FIG. 8. At step 621, a calling subscriber 516a (FIG. 5) dials the telephone number of a called subscriber 516n. At 622, it is determined whether or not the originating LS 513a has been upgraded to utilize the SS7 signaling protocol. If not, then the LS cannot directly access the AIN 512, and the signal is routed, at step 623, to the associated telephone Service Switching Point/Tandem (SSP/T) 514 via a low speed MF trunk 515. At step 624, AIN service is invoked in the SSP/T 514 which recognizes the dialed number as an AIN subscriber at 625. At step 126, the SSP/T 14 sends a Query message via the STP 518 to the SCP 519 requesting call processing instructions. The SCP performs a database lookup on the called subscriber's service that is being invoked at step 627, and then returns routing instructions to the SSP/T 514 at step 628. This response contains all of the information that is necessary to route the call (i.e., routing number, carrier, billing number, etc.). The SSP/T 514 receives the routing instructions from the SCP 519, and completes the call at step 629 by setting a MF trunk 515 between the calling subscriber 516a and the called subscriber 516n.

If, however, at step 622 it is determined that the LS is SS7-capable, then the message flow moves to step 631 where it is determined whether or not the LS has been upgraded with the latest release of the TCAP/AIN communications protocol. If not, then the flow again moves to step 623 where the signal is routed to the associated SSP/T 514 via MF trunk 515. Steps 624 through 629 are then utilized to retrieve the enhanced subscriber service.

If, at step 631, it is determined that the LS has been upgraded with the latest release of the TCAP/AIN communications protocol, then the LS may directly access the AIN 512. At step 632, AIN service is invoked in the LS which recognizes the dialed number as an AIN subscriber at 633. At step 634, the LS sends a Query message via the STP 518 to the SCP 519 requesting call processing instructions. The SCP performs a database lookup on the called subscriber's service that is being invoked at step 635, and then returns routing instructions to the LS 513 at step 636. This response contains all of the information that is necessary to route the call (i.e., routing number, carrier, billing number, etc.). The LS 513 receives the routing instructions from the SCP 519, and completes the call at step 637 by setting a MF trunk 515 between the calling subscriber 516a and the called subscriber 516n.

The preceding background discussion of the operation of the SS7 common channel signaling network paraphrases a discussion in U.S. Pat. No. 5,377,186. The contents of that patent are herein incorporated in their entirety by reference. A further description of the operation of the SS7 common channel signaling network is found in U.S. Pat. No. 5,247,571 which is incorporated herein by reference.

Figure 9:
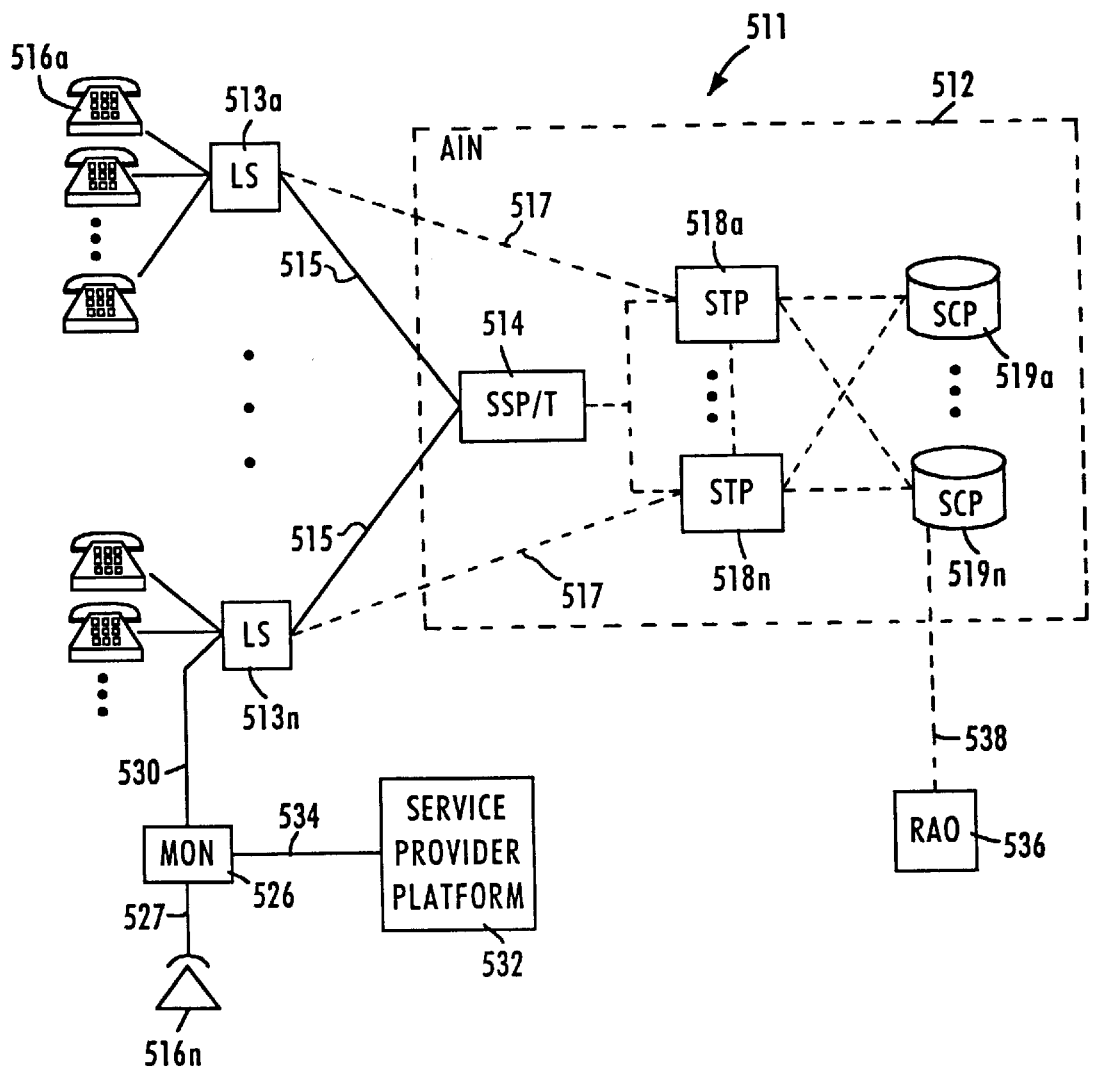
FIG. 9 is a simplified block diagram of another embodiment of the invention utilizing the capabilities of the common channel signaling system and an Advanced Intelligent Network (AIN) for information handling.

Referring to FIG. 9 there is shown another arrangement to provide leased access of local loops in a switched telecommunications network to third party providers including an arrangement for monitoring, measuring and billing for usage. In that figure there is shown at 511 a simplified block diagram of a typical communications system using an Advanced Intelligent Network (AIN) 512 of the type illustrated and described in connection with FIG. 5. Similarly reference numerals have been used to refer to similar parts in the two figures. In the embodiment of the invention illustrated in FIG. 9, there is shown a telephone terminal 516n connected to a monitor 526 via the terminal portion 527 of the local loop which originates at the Local Switch 513 in loop portion 530. The loop portion 530 is connected to the monitor 526.

The telephone terminal 516n is connected through the monitor 526 to an alternate service provider platform 532 via alternate service provider line 534. Through line 534, monitor 526 and leased local loop portion 527 the alternate service provider 532 may access and provide service to a customer terminal connected to the local loop portion 527. Such terminal may be any one or more types of devices, such as a telephone terminal, television, facsimile machine, computer or the like. Through such arrangement the alternate service provider accesses the customer premise at which the terminal 516n is located and pays for use of the local loop 527 on a usage basis as previously discussed. According to this embodiment of the invention a Service Control Point (SCP) 519n is utilized to perform the processor and storage functions of the monitor center or processor and storage 102 in the embodiment of the invention of FIG. 2, as will be described in further detail. The SCP 519n is connected to an accounting and billing center which is here illustrated as the Records Accounting Office (RAO) 536 connected to the SCP by link 538.

Figure 10:
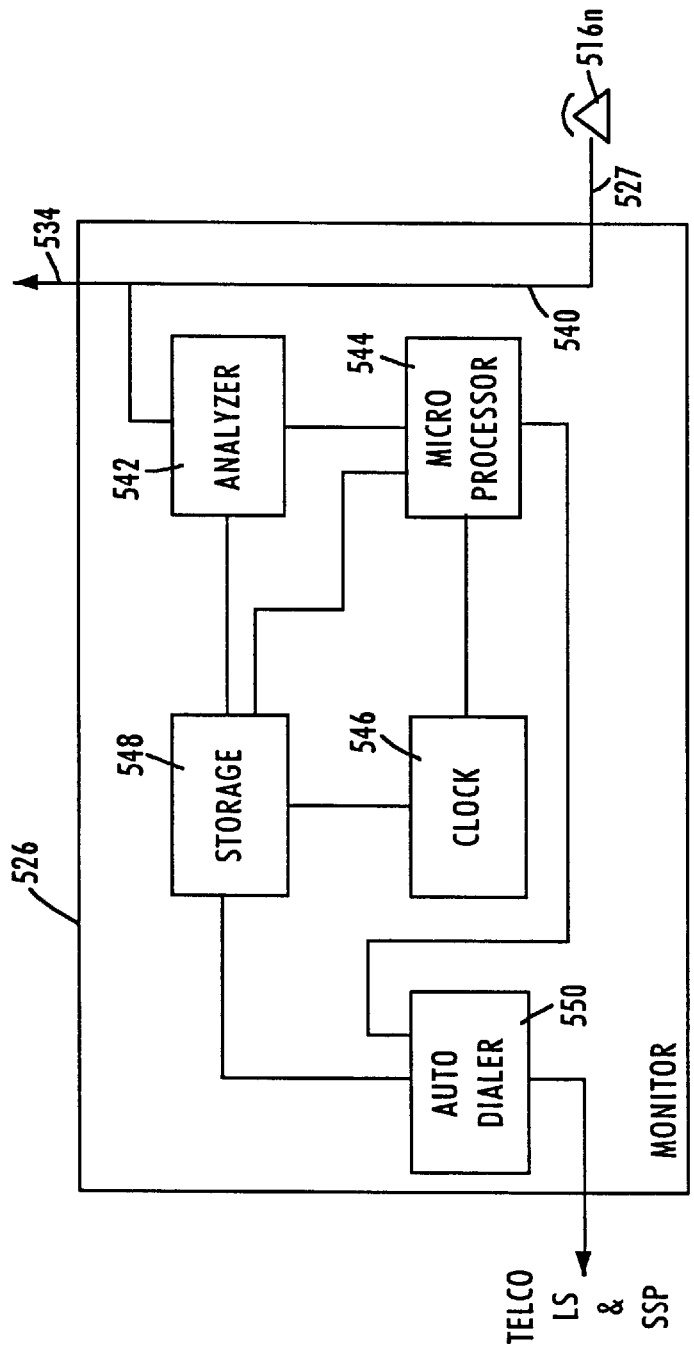
FIG. 10 is a simplified block diagram of a monitor for use with the embodiment of the invention shown in FIG. 9.

A monitor suitable for utilization in this embodiment of the invention is shown in block diagram in FIG. 10. Referring to that figure the monitor 526 is connected to the illustrative telephone terminal 516n by the terminal portion 527 of the local loop. This terminal portion of the local loop is connected within the monitor to the line 534 to the service provider platform 532 in FIG. 9. Within the monitor 526 the terminal local loop portion 527 is connected to the service provider line 534 by internal connecting link 540. Tapped onto this link 540 is the analyzer 542. While this connection is shown as a bridging connection it will be understood that the analyzer could be wired in series with the line or inductively or otherwise coupled thereto.

The analyzer receives and analyzes signaling, voltage levels, and the provided service signals on the link between the service provider platform and the particular terminal which may be connected to the local loop in the customer premise. The monitor is provided with a microprocessor 544, clock 546, storage 548 and auto dialer 550. The auto dialer delivers an output to the telephone network Local Switch (LS) and thence to the connected Signal Switching Point (SSP), which is shown in FIG. 9 as an SSP tandem (SSP/T) 514. The monitor 526 tracks the usage of the local loop between the premise and the alternate service provider for all usage whether or not that usage is initiated by the customer from the customer premise or is initiated by the service provider.

The operation of the embodiment of the invention illustrated in FIGS. 9 and 10 is as follows:

Assuming a loop usage initiated by the customer through the use of the telephone terminal 516n, the customer goes off-hook and dials a directory number which is here assumed to be a 10-digit directory number. While directory numbers of other lengths may be utilized, the digits of the dialed number are used for conveying signaling information both to the lessee service provider as well as to the monitor and lessor telephone company. Thus, the number of dialed digits may be determined as a contractual matter between the telephone company and the alternate service provider. The dialed digits may and usually do have significance to the alternate service provider in that the nature of the ordered service may be signaled through this medium.

In one embodiment the alternate service provider may provide alternate telephone service so that the dialed digits identify the called party. On the other hand, the service provider may also provide wide band television service and the customer may identify the desired channel or movie by dialing program or movie identification codes published by the service provider in a known manner. Such codes may also be provided to the lessor telephone company. In the case where the nature of the program signal is identified by dialed digits which are supplied to the lessor telephone company it is unnecessary that the analyzer 542 provide signal analysis of the type described previously in connection with the preceding embodiments of the invention.

When the customer at the terminal 516n goes off-hook the DC voltage level on the local loop and monitor line 540 changes from approximately 48 volts to a much lower value. The dialing of digits by the customer results in ringback signals followed by silence when the called party goes off-hook. This is further followed by audio or other signals from the called party. The aforementioned DC voltage changes and this signaling sequence is detected by the monitor and used as a commence connection signal. The commence connection signal is utilized to provide a commence timing signal for computing the duration of loop usage. The analyzer 542, microprocessor 544, and clock 546 are programmed to initiate the following steps.

The digits dialed by the customer are stored in the storage 548. Upon the occurrence of the commence timing signal the microprocessor 544 signals the autodialer 550. The autodialer then speed-dials the digits which had been previously stored in the storage 548. These digits signify the nature of the service provider signal which is to commence traversing the leased local loop. The dialed digits from the autodialer 550 are fed through the Local Switch 513n to the SSP 514. Upon receiving the digits the SSP is triggered to formulate and transmit a TCAP message to the SCP 519n. The TCAP message contains all of the information in the dialed digits in addition to the time that the TCAP message was dispatched. This data is stored in the SCP 519n as an indication that usage of the local loop 527 for an identified type of signal has commenced at an identified time. The identity of the local loop may be established by Automatic Number Identification (ANI) of the autodialer and/or of the monitor coupled to the loop.

At the time that the monitor detects the commence connection condition and starts the autodialing, the analyzer and microprocessor are set or placed in condition to detect silencing of the transmitted provider signal and/or a change in the DC voltage on the monitored loop. The latter indicates that the customer terminal went on-hook. When this occurs the autodialer is triggered to speed-dial a second number to the Local Switch and SSP. This number may be, for example, the same number as was dialed for commencement but with one changed digit. This in turn triggers the formulation and transmittal of a TCAP message to the SCP indicating a termination of the usage and the time thereof. The SCP periodically downloads its loop usage information to the Revenue Accounting Office which attends to the preparation and forwarding of suitable bills to the customer and/or service provider.

In the situation where the loop usage is initiated by the alternate service provider, the monitor and customer terminal will receive over the local loop a ringing signal. Along with the ringing signal there is also sent a data signal between rings in a known manner. This data signal identifies the calling service provider, if there are more than one, and identifies the nature of the signal to follow. The manner of signal identification and of signaling content in general is arranged through the lease agreement. The data arriving with the ring signal is temporarily stored in the analyzer or storage. When the customer terminal goes off-hook the analyzer detects the DC voltage change and the cessation of ringing and the accompanying data signal. This is followed by momentary silence and a signal of a different nature. This sequence constitutes the commence connection signal.

The commence connection signal causes the autodialer to speed-dial digits which convey information regarding the commencement and nature of signal to the SSP in the dialed digits. The SSP in turn formulates and transmits a TCAP message to the SCP. This TCAP message indicates the commencement of loop usage and the nature of the signal and the SCP stores this information. At the same time that the autodialer is triggered to speed-dial the digits the monitor is set to await and be triggered by the cessation of usage of the loop. This condition is signaled by cessation of the service signal detected in the analyzer followed shortly thereafter by the change in DC voltage on the loop. On the other hand these conditions may occur simultaneously when the customer terminates the loop usage by going on-hook. This causes the autodialer to speed-dial a second number to the Local Switch and SSP. The SSP reacts by formulating and transmitting a suitable TCAP message to the SCP to indicate termination of this usage and the time of such termination. As in the preceding case the number which is speed-dialed to indicate such termination of usage may be the same as the number dialed to indicate commencement with the change of a signal digit, by way of example.

Figure 11:
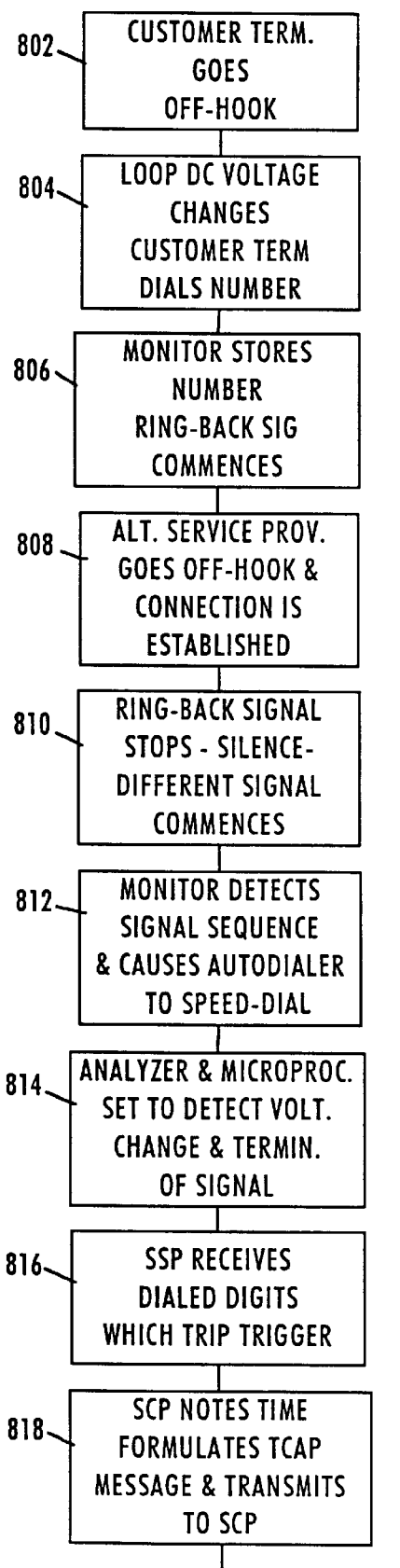
FIG. 11 is a simplified flow diagram illustrating the operation of the embodiment of the invention of FIGS. 9 and 10 where the usage of the local loop is originated from the customer premise end.
Figure 11:
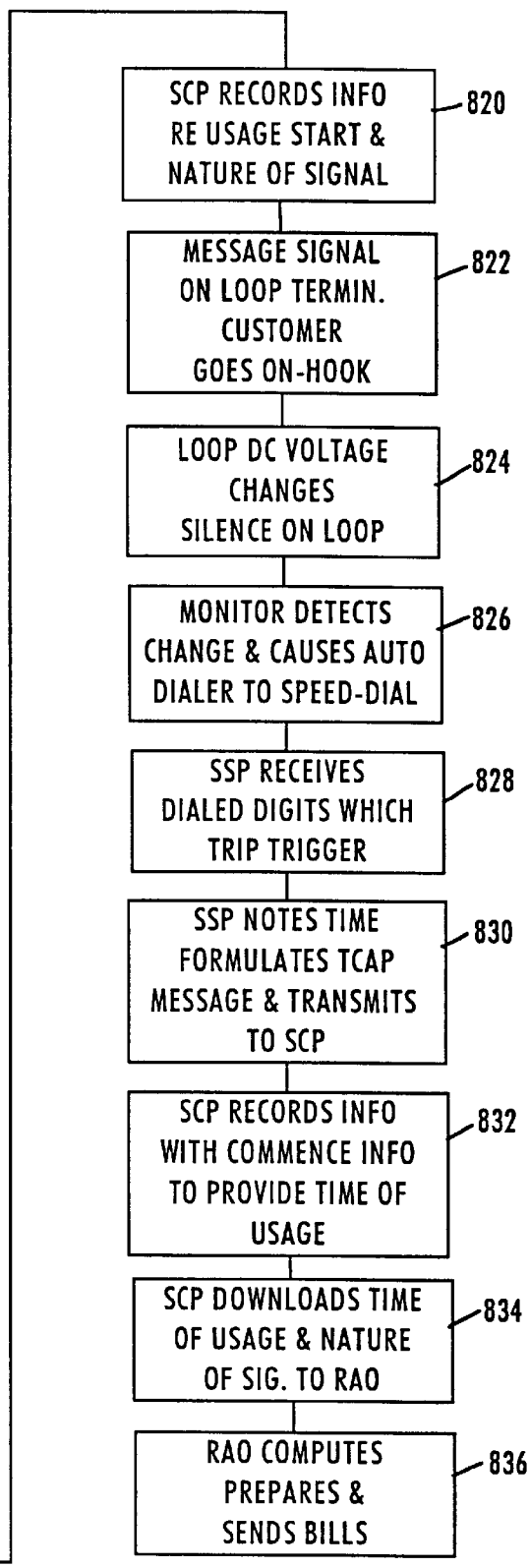
Figure 12:
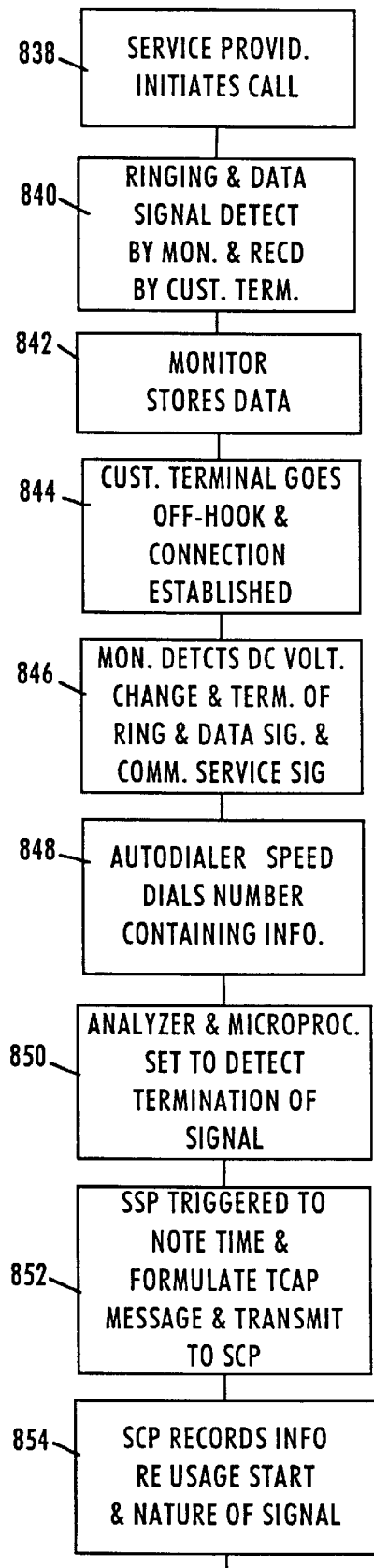
FIG. 12 is a simplified flow diagram illustrating the operation of the embodiment of the invention of FIGS. 9 and 10 in the situation wherein the loop usage is originated from the alternate service provider service platform.
Figure 12:
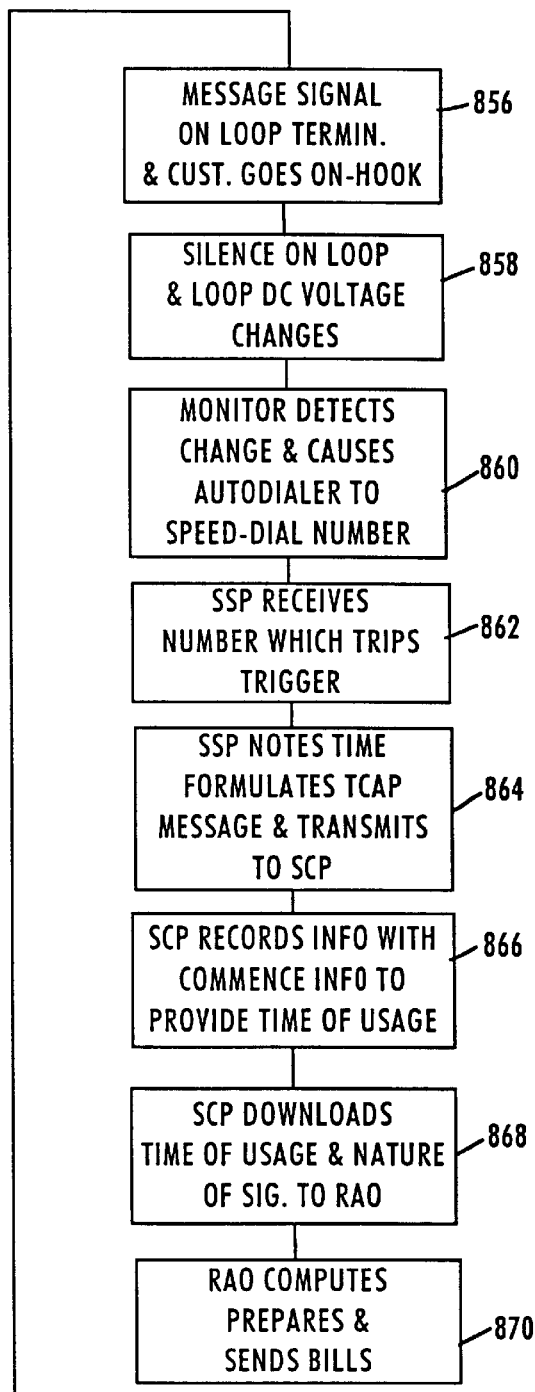

The operation is illustrated in flow chart form in FIGS. 11 and 12. Referring to FIG. 11, in the situation where the customer terminal originates the loop usage, the customer terminal goes off-hook at 802. At 804 the DC loop voltage changes as a result of the off-hook condition and the customer terminal dials a number. The monitor stores the dialed number at 806 and a conventional ring-back signal from the service provider service platform commences. At 808 the alternate service provider platform goes off-hook and connection is established. At this time the ring-back signal ceases. This is followed by silence and then commencement of the service providers message or service signal, as shown at 810. At 812 the monitor detects the foregoing signal-silence-different signal sequence causes the autodialer to speed-dial the previously stored number. At the same time the analyzer and microprocessor in the monitor are set to detect a DC voltage change on the loop and a termination of the service signal as shown at 814.

At 816 the SSP receives the digits which were dialed at 812. The receipt of these digits trips the SSP trigger. At 818 the SSP notes and stores the time and formulates a TCAP message which includes information identifying the service provider, loop, monitor or customer, the nature of the signal and the time of commencement of loop usage. The SSP then transmits this TCAP message to the SCP. At 820 this information is received by the SCP which records the information.

Usage of the leased loop to carry the alternate provider signal is now in progress. At the termination of this usage the alternate provider service message will terminate and the customer terminal will go on hook. This condition is shown at 822. The change in DC voltage and silence on the loop is shown at 824. At 826 the monitor detects this change and causes the autodialer to speed-dial predetermined termination of usage digits. As previously pointed out, these may constitute the same digits which were dialed to indicate commencement of use, but with the change of one digit. At 828 the SSP receives the dialed digits which trip the trigger set for tripping on the receipt of such digits.

The SSP notes and stores the time and formulates a TCAP message and transmits the same to the SCP at 830. This message contains the identity of the alternate service provider, the loop, monitor or customer and time. At 832 the SCP records this information in association with the information previously recorded at the commencement of usage. From these two pieces of information the duration and nature of usage may be ascertained. At 834 the SCP downloads the time of usage and the nature of the signal to the record accounting office (RAO), along with the identification of the loop and alternate service provider. At 836 the RAO computes and prepares a suitable bill and forwards the bill to the alternate service provider and/or the customer, as arranged between the telephone company, alternate service provider and customer.

Referring to FIG. 12 there is shown the situation where the alternate service provider originates the loop usage. At 838 the service provider platform initiates a call. This results in a ringing signal on the loop. The ringing signal contains data between rings in a known manner. In this case the data identifies the service provider and the nature of the signal to be transmitted, and may also identify the loop, monitor and/or customer. This ringing plus data signal is detected by the monitor and received by the customer terminal as indicated at 840. The monitor stores the data at 842. Reacting to the ringing signal, the customer terminal goes off-hook at 844 and connection is established. At 846 the monitor detects a DC voltage change on the loop and also detects the sequential termination of the alternate service provider ring and data signal.

At 848 the monitor causes the autodialer to speed-dial a number whose digits contain the information from the data. At this time the analyzer and microprocessor are set to detect a termination of the service signal as indicated at 850. At 852 the SSP receives the dialed number and is triggered to note the time and formulate a TCAP message containing the information and transmit the same to the SCP. The SCP records the information regarding the start of usage and the nature of the signal as well as the identity of the service provider, loop, monitor and/or customer, as indicated at 854. The delivery of the service provider message over the loop is now in progress.

The delivery of the message signal is terminated at 856 whereupon the customer terminal goes on hook. There is now silence on the loop and the on hook condition causes the DC voltage on the loop to change as indicated at 858. At 860 the monitor detects the DC voltage change and the silence on the loop and causes the autodialer to speed-dial a number. This number may be the same as the original number with the change of one digit as heretofore described. At 862 the SSP receives the dialed number which trips the trigger. This causes the SSP to note the time and formulate a TCAP message which is then transmitted to the SCP as indicated at 864. At 866 the SCP records the information in association with the commencement of use information to provide data as to the time of usage and nature of the signal. The SCP then periodically downloads to the revenue accounting office the data regarding time of usage, nature of signal, and identity of service provider, loop, monitor and/or customer. This is indicated at 868. At 870 the RAO computes, prepares and sends appropriate bills to the alternate service provider and/or the customer. It will be understood that such billing need not occur on a per use basis but at regular time intervals such as on a monthly basis.

Figure 13:
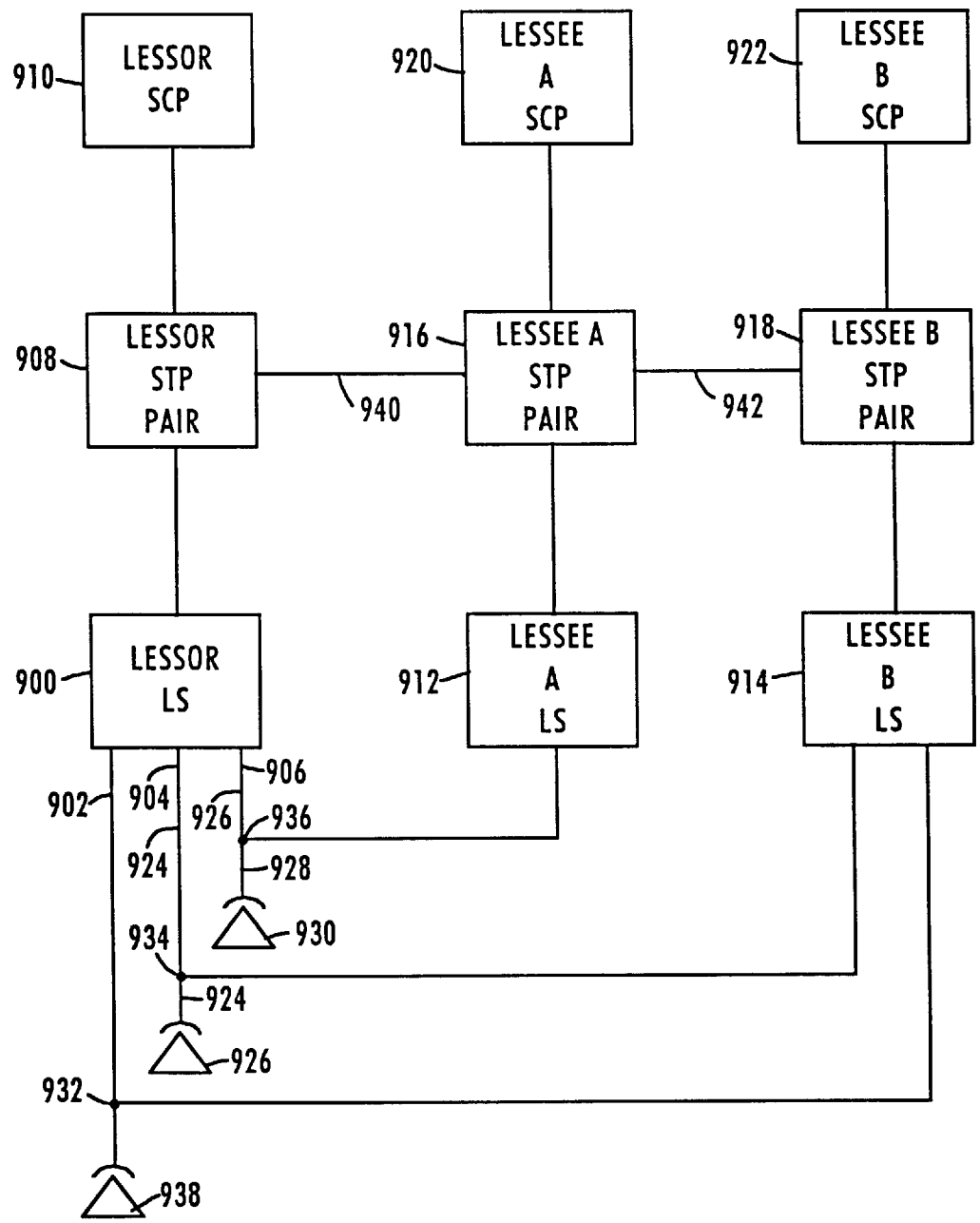
FIG. 13 is a simplified block diagram illustrating a further embodiment of the invention.

Referring to FIG. 13 there is illustrated yet another embodiment of the invention. As shown in that figure, an end office or local switch (LS) 900 of a lessor local telephone company (Telco) provides three illustrative local loops 902, 904 and 906 for full or shared use by lessees. The local telephone company may for example be a regional Bell operating company. The local switch 900 is connected by CCIS data links to a pair of signalling transfer points (STPs) shown illustratively as the STP pair 908. The STP pair 908 in turn is connected to a service control point (SCP) 910. The operation of the CCIS network is as described in connection with FIGS. 5–8. The local switch 900 is connected by conventional trunks to the remainder of the telephone network (not shown).

In the illustrated implementation of this embodiment of the invention shown in FIG. 13, two lessee alternate service providers are shown as having service platforms or local switches (LSs) 912 and 914. These local switches constitute parts of networks of the alternate service providers and are controlled by CCIS SS7 systems which are represented in FIG. 13 by the signal transfer points (STPs) 916 and 918 and the service control points (SCPs) 920 and 922.

The Telco local loops 904 and 906 are disconnected from the lessor Telco switch at 924 and 926. However the local loop 902 is intended for shared usage and remains connected to the Telco local switch 900. In the illustration of FIG. 13 it is assumed by way of example that the lessee service provider A (SCP 920) provides plain old telephone service (POTS) or ISDN telephone and data services. By way of illustration it is also assumed that the lessor service provider B (SCP 922) provides multiplexed data services or digital video services using frequency bands that are above the baseband frequencies used for (POTS) or ISDN. The lessee service provider B has contracted for exclusive use of the local loop termination 924 serving terminal 926. At the same time service provider B has also contracted for shared usage of local loop 902, which remains connected to the local Telco's local or end office switch 900. Service provider A has arranged exclusive lease of the local loop termination 928 which serves the customer premise terminal 930.

FIG. 13 shows at 932, 934 and 936 connections or bridges to the loops to provide service to the customer terminals 938, 926 and 930 respectively. The connections to the disconnected loops 904 and 906 are made to the terminations 924 and 928. The loop 902 remains connected to the local switch 900 and is leased for shared usage by the Telco and the alternate service provider B. The connection or bridge 932 preferably provides access to alternate bandwidth on the loop 902, although multiple providers may alternately use the same bandwidth. While the shared loop is shown in FIG. 13 as being used by the Telco and the alternate service provider B, it is also intended that disconnected loops may be served or shared by multiple alternate service providers.

In the illustration of this embodiment of the invention the end offices or local switches 900, 912 and 914 for each of the networks have signaling point (SP) functionality permitting common channel signaling CCIS control of each network through its SS7 compliant packet switched data network. These networks are only partially shown in FIG. 13 as will be understood by those skilled in the art. The local switch 912 connects to the mated pair of signaling transfer points (STPs) 916 in the network of service provider A. The local switch 914 connects to the mated pair of signaling transfer points (STPs) 918 in the network of service provider B. The STPs 912 and 914 provide independent CCIS packet switched signaling data communications for the two service providers' networks, in the normal manner.

In accordance with the present invention, the alternate service provider STPs 916 and 918 also communicate via links 940 and 942 with one or more STPs 908 of the local telephone company's CCIS network. While the STPs 916 and 918 are shown as connected together this is not necessary so long as each alternate service provider's CCIS network is connected to the lessor Telco's CCIS network. Thus the connection from the STP 918 may be made directly to the Telco STP 908 without connection to the STP 916.

The present invention contemplates using and/or monitoring SS7 signaling of the local switches 900, 912 and 914 relating to calls to and from the local loops 902, 924 and 928 through those switches as an indication of usage of the leased loops by the alternate service providers A and B. This monitoring occurs as a function of the operation of the CCIS networks of the alternate service providers and requires no separate monitors as with preceding embodiments of the invention. Monitoring data is reported from these networks to a lessor Telco database for processing, billing and mediation purposes. This occurs without the need to add equipment to the alternate service provider networks and without the need for lessor Telco employees to visit or service equipment on lessee premises.

This embodiment of the invention may be implemented through multiple techniques for using SS7 messages for this purpose without the necessity of adding additional monitoring equipment. In a first technique duplicate copies of certain conventional SS7 messages indicating set-up and tear-down of connections to the particular local loop are forwarded to a suitable lessor Telco database. According to the second technique, the local switches or alternate service provider platforms 912 and 914 may trigger TCAP query messages to the lessor Telco database in response to call completion and call disconnect.

As stated, the first technique uses duplicate copies of certain SS7 messages indicating set-up and tear-down of connections, i.e. selected conventional ISDN-UP messages. For an alternate service provider using telephone call type set-up processing, a local switch or end office switching system of the service provider, such as those shown at 912 or 914, responds to an off-hook condition in the normal fashion and receives dialed digits from the calling station. The calling station in this instance may be any of the customer terminals 926, 930 or 938. In the case of off-hook conditions at any of these customer terminals the originating end office switching system would be one of the local switches 900, 912 or 914. Upon occurrence of the off-hook condition the particular switch, following SS7 convention, suspends the call and sends an Initial Address Message (IAM) through the involved CCIS network to the service provider's end office switching system serving the destination terminal. In this example such end office switching system is a switching system of alternate service provider A or B and the terminal may be a telephone station in the case of telephone service or a server in the case of video or data services.

The particular terminating end office determines whether or not the called line is busy. If the called line is busy, the terminating end office so informs the originating end office via an Address Complete Message (ACM) type CCIS message, and the originating end office 912 or 914 provides a busy signal to the calling station. If the called line is not busy, the terminating end office sends an ACM message so informing the originating end office. The originating office 912 or 914 then provides ringback or equivalent signal to the calling customer's terminal, and the terminating office applies ringing current to the line to the called party, the alternate service provider. When the terminal connected to the called line goes off-hook, the terminating end office sends an Answer Message (ANM) back to the originating end office through the CCIS network indicating that the called station has answered. At that time, the actual telephone or signal traffic trunks are connected together between the two end offices. This event represents the start point for measuring duration of this usage of this leased local loop.

According to the first technique of this embodiment of the invention, the alternate providers' network is programmed to supply a copy of the ANM message indicating call completion to the lessor Telco database. When the call is terminated, the end offices serving the call exchange CCIS messages as part of the procedure for tearing down the connection. Thus after one terminal connected in the call goes on-hook a Release message (REL) is sent from the SSP to the STP which forwards the REL to the other end office switch (SSP). The REL is received by the SSP which returns a Release Complete Message (RLC) via the STP to the SSP which sent the REL and disconnection is completed. The alternate provider's network is programmed to send a copy of this REL via the Telco's SS7 network to the lessor Telco's database. The REL may be carried by the link to the Telco STP pair 908. This marks the end of this particular usage of the leased local loop by the alternate service provider.

There are two techniques for sending relevant duration of use signalling messages to the lessor Telco database. In the first technique described above, the local switch 912 or 914 generates the copy of the relevant signal with appropriate SS7 addressing to route the signal through the STPs and data links to the lessor Telco database. Consider for example the ANM message and processing by the local switch 912. If the local switch 912 is the terminating office (incoming call to loop 928), when the local switch 912 transmits the ANM message to the originating office, the local switch 912 sends a duplicate copy to the lessor Telco database. If the local switch 912 is the originating office (outgoing call from line 928), then part of the call connection procedure executed in response to the ANM message would require that the local switch 912 readdress the message and forward the readdressed message through the CCIS network to the lessor database. If the call were an intra-office call (not requiring CCIS signaling for call set-up), then the local switch or end office 912 would formulate and transmit an ANM message at call completion and an appropriate message at call tear-down, to the lessor Telco database.

With these commence and terminate usage signals the lessor Telco database and associated processor can calculate and store the usage data for billing usage in the manner described in connection with the preceding embodiments of the invention. While any suitable lessor Telco database and processor may be used for this purpose the function is preferably served by the involved Telco SCP. The SCP may periodically download to the revenue accounting office the data regarding time of usage, identity of service provider, loop and/or customer or subscriber. The nature of the use, i.e., the nature of the signal, may be included if the arrangement with the alternate service provider includes a provision for identification of the signal in the CCIS SS7 signalling.

The second technique for signalling the lessor Telco database relies on the use of TCAP query messages. In this embodiment, processing of every call to and from the leased local loop triggers AIN-like processing. By way of illustration of this embodiment, the relevant end offices all have full Service Switching Point (SSP) capability. A call completion trigger and a disconnect trigger are set in the subscriber profile for the local loop of the subscriber, in the local switch serving that line. Consider processing by the end office 912 as an illustrative example.

When the end office 912 detects call completion for the local loop 928, that end office initiates communication with the lessor Telco database. If the call is directed to the local loop 928, the end office 912 detects completion in response to an off-hook by a terminal connected to the local loop 928. If the call is from the local loop 928, then the end office 916 detects completion in response to completion at the destination station, e.g. in response to an ANM message from the terminating end office on an inter-office call.

The communication with the lessor Telco database utilizes Transaction Capabilities Applications Protocol (TCAP) type SS7 messages. The message sent from the end office 912 may utilize an initial query type TCAP message. Such a message includes several relevant data fields, including dialed digits and calling party identification. For an incoming call, the dialed digits identify the local loop 928. For an outgoing call, the calling party identification indicates the calling party local loop. If processing of TCAP query messages by the central office requires a TCAP response, then the lessor Telco database would provide an appropriate TCAP response message, essentially providing a confirmation of receipt of the query message.

The end office initiates a similar TCAP query when the call to or from the local loop 928 is torn down. Specifically, the end office sends a similar query message, identifying the local loop 928 to the lessor Telco database, in response to a disconnection of the station on the local loop 928.

The foregoing description related to local loops which were disconnected from the Telco end office switch 900, such as the loops 924 and 928. However, the monitoring through the CCIS SS7 networks and signalling which were discussed applies equally if the Telco end office switch 900 remains connected to the local loop. It is an advantage of the invention that such an arrangement may be utilized to implement effective mediation between two competing providers who alternately utilize the same bandwidth capacity on the loop. Such a situation is illustrated by the switch connected local loop 902 which is shared by the Telco and the alternate service provider B.

For example, alternate provider B may provide a long distance POTS service using an analog connection to the local loop 902. The Telco end office switch 900 also may provide POTS, though the subscriber prefers to use the local Telco network only for local calls. The end office switch 900 is programmed to disconnect in response to a recognized dialing event (e.g. dialing a '*' or dialing a '1') or an incoming call through the alternate service provider B end office 914. These same events activate processing by the alternate POTS central office 914. The lessor Telco end office 900 and the alternate provider B end office 914 report call completions and tear-downs for the local loop 902 to at least the lessor Telco database in exactly the manner described above. At the option of the alternate service provider similar techniques may be used to report set-up and tear down to an alternate service provider database for billing or other purposes. Plural databases of the respective service providers may be linked through the linked CCIS networks and may be queried.

Thus if one of the providers has a call for the local loop 902, that provider's end office checks the relevant associated databases to determine if the desired bandwidth on the local loop 902 is already in use by one of the other providers. For example, if a lessor Telco end office 900 has an incoming voice telephone call for local loop 902, that office checks first with the lessor Telco database to determine if the local loop is already in use for a voice frequency call, and completes the call only if the voice capacity on the local loop 902 is available.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A communication system comprising a switched telephone network connected by program controlled switches (PCSs) controlled by a data switched common channel interoffice signaling (CCIS) network having a central controller and storage, said communication system including at least one end office switch having access to communication with said CCIS network and central controller, and local loop lines for connecting said end office switch through a distribution frame interface to customer premises, said local loop lines having said distal ends connected to customer premises terminals and having near ends connected to said interface for connection to said switch, at least certain of said local loop lines connected to customer premises being disconnected from said end office switch at said interface;

a service provider network connected to at least one of said disconnected local loop lines connected to customer premises for providing signals over said line to a terminal at said customer premises;

said service provider network including program controlled switches (PCSs) controlled by a data switched common channel interoffice signaling (CCIS) network having a central controller and storage;

a link connecting the CCIS networks of said telephone network and of said service provider network;

said CCIS network of said service provider network transmitting to said CCIS network of said telephone network CCIS signals indicative of commencement and discontinuance of service provider signals to said disconnected local loop line to permit storage of information regarding the times of commencement and discontinuance of service provider signals on said line as a measure of usage thereof by said service provider.

2. A communication system according to claim 1 including a billing compiler accessing said stored information and preparing bills for usage of said local loop line.

3. A communication system according to claim 1 wherein said CCIS signals exchanged between said CCIS networks occurs via signal transfer points in said respective CCIS networks.

4. A communication system according to claim 1 wherein said CCIS signals exchanged between said CCIS networks comprises signals in the form of CCIS call set-up and call tear-down signals.

5. A communication system according to claim 1 wherein said CCIS signaling exchanged between said CCIS networks comprises signals utilizing transaction capabilities application part (TCAP) protocol.

6. A communication system according to claim 1 wherein said storage is in said central control storage in said CCIS network in said telephone network.

7. A communication system according to claim 1 including a billing compiler for calculation of billing for said usage, said stored information regarding the times of commencement and discontinuance of service provider signals on said local loop line being periodically downloaded to said billing compiler.

8. A communication system comprising a pair of switched communication networks each including trunked together switches controlled by separate data switched networks having a central controller and storage, said communication system including in each of said communication networks at least one end office switch having access to communication with its data switched network and central controller, and local loop lines for connecting the end office switch in a first of said networks through a distribution frame interface to customer premises, said local loop lines having said distal ends connected to customer premises terminals and having near ends connected to said interface for connection to said switch, at least one of said local loop lines connected to customer premises being disconnected from said end office switch at said interface;

at least one service provider connected to a second of said networks and connected via said network to said disconnected local loop line in said first network and connected via that disconnected local loop line to customer premises for providing signals over said local loop line to a terminal at said customer premises;

said data switched networks being connected together for exchange of data therebetween;

said data switched network of said second network transmitting to said data switched network of said first network common channel signaling signals indicative of commencement and discontinuance of service provider signals to said disconnected local loop line to permit storage of information regarding the times of commencement and discontinuance of service provider signals on said local loop line as a measure of usage thereof by said service provider.

9. A communication system according to claim 8 including a billing compiler accessing said stored information and preparing bills for usage of said local loop line.

10. A communication system according to claim 8 wherein said common channel signaling exchanged between said data switched networks occurs via signal transfer points in said respective data switched networks.

11. A communication system according to claim 8 wherein said common channel interoffice signaling exchanged between said data switched networks comprises signals in the form of common channel interoffice signaling call set-up and call tear-down signals.

12. A communication system according to claim 8 wherein said common channel interoffice signaling exchanged between said data switched networks comprises signals utilizing transaction capabilities application part (TCAP) protocol.

13. A communication system according to claim 8 wherein said storage is in said central control storage for said data switched network in said first network.

14. A communication system according to claim 8 including a billing compiler for calculation of billing for said usage, said information regarding the times of commencement and discontinuance of service provider signals on said local loop line being periodically downloaded to said billing compiler.

15. In a communication system comprising a pair of switched communication networks each including trunked together switches controlled by separate data switched networks having a central controller and storage, said communication system including in each of said communication networks at least one end office switch having access to communication with its data switched network and central controller, and local loop lines for connecting the end office switch in a first of said networks through a distribution frame interface to customer premises, local loop lines having said distal ends connected to customer premises terminals and having near ends connected to said interface for connection to said switch, at least one of said local loop lines connected to customer premises being disconnected from said end office switch at said interface; the method comprising;

transmitting a service provider signal via a second of said networks to said disconnected local loop line in said first network and over that line to customer premises;

said data switched networks being connected together for exchange of data therebetween;

transmitting from said data switched network of said second network to said data switched network of said first network data signals indicative of commencement and discontinuance of service provider signals to said disconnected local loop line to permit storage of data regarding the times of commencement and discontinuance of service provider signals on said line as a measure of usage thereof by said service provider.

16. A method according to claim 15 including the step of storing said commencement data and said termination data in said central control and storage by switched data signaling.

17. A method according to claim 16 including the step of transmitting said data signals from a signal switching point associated with an end office in said second network.

18. A method according to claim 17 including the step of transmitting said data signals from said signal switching point to at least one signal transfer point and thence to said central control point and storage for said first network.

19. A method according to claim 15 wherein said data signals exchanged between said data switched networks comprises signals in the form of common channel signaling call set-up and call tear-down signals.

20. A communication system according to claim 15 wherein said data signals exchanged between said data switched networks comprises signals utilizing transaction capabilities application part (TCAP) protocol.

21. A method according to claim 15 including the step of storing said commencement data and said termination data in said central control and storage by switched data signaling.

22. In a communication system comprising a pair of switched communication networks each including a first network of program controlled switches (PCSs) controlled by data switched networks having a central controller and storage, said communication system including in each of said communication networks at least one PCS having access to communication with its data switched network and central controller, said at least one PCS in one of said first networks being connected to local loop lines through a distribution frame interface to customer premises, said local loop lines having said distal ends connected to customer premises terminals and having near ends connected to said interface for connection to said switch, at least one of said local loop lines to customer premises being disconnected from said at least one PCS at said interface;

the method comprising;

transmitting via the other of said first networks a first signal to said disconnected local loop line and over that line to said customer premises;

transmitting from the data switched network of the other of said first networks to the data switched network of said one of said first networks data signals indicative of commencement and discontinuance of said first signals to said disconnected local loop line; and storing data regarding the times of commencement and discontinuance of said first signals on said disconnected local loop line as a measure of usage thereof.

23. A method according to claim 22 including the step of using said stored data to calculate a bill for said usage of said disconnected local loop line.

24. A method according to claim 22 wherein said one of said first networks is a telephone network.

25. A method according to claim 24 wherein said data switched network of said telephone network is a common channel interoffice signaling (CCIS) network using Signaling System #7.

26. A method according to claim 25 wherein said data switched network of the other first network is a common channel interoffice signaling (CCIS) network using Signaling System #7.

27. A method according to claim 26 wherein said data signals indicative of commencement and discontinuance of said first signals to said disconnected local loop line comprise virtual copies of connection set-up and connection tear-down signals generated in said data network of said first network supplying said first signals to said disconnected local loop line.

28. A method according to claim 22 including the step of storing said data signals indicative of commencement and discontinuance of said first signals to said disconnected local loop line in said storage associated with said central control for the data network for said one of said first networks.

29. A communication system according to claim 22 wherein said data signals indicative of commencement and discontinuance of said first signals to said disconnected local loop line comprise signals utilizing transaction capabilities application part (TCAP) protocol.

30. In a communication system comprising a pair of switched communication networks each including a first network of program controlled switches (PCSs) controlled by data switched networks having a central controller and storage, said communication system including in each of said communication networks at least one PCS having access to communication with its data switched network and central controller, said at least one PCS in one of said first networks being connected through a distribution frame interface to lines to customer premises, said local loop lines having said distal ends connected to customer premises terminals and having near ends connected to said interface for connection to said switch;

the method comprising;

transmitting via the other of said first networks a first signal to one of said local loop lines to customer premises and over that line to said customer premises;

transmitting from the data switched network of the other of said first networks to the data switched network of said one of said first networks data signals indicative of commencement and discontinuance of said first signals to said local loop line; and storing data regarding the times of commencement and discontinuance of said first signals on said local loop line as a measure of usage thereof by said first signals.

31. A method according to claim 30 including the step of using said stored data to calculate a bill for said usage of said local loop line.

32. A method according to claim 30 wherein said one of said first networks is a telephone network.

33. A method according to claim 32 wherein said data switched network of said telephone network is a common channel interoffice signaling (CCIS) network using Signaling System #7.

34. A method according to claim 33 wherein said data switched network of the other first network is a common channel interoffice signaling (CCIS) network using Signaling System #7.

35. A method according to claim 34 wherein said data signals indicative of commencement and discontinuance of said first signals to said local loop line comprise virtual copies of connection set-up and connection tear-down signals generated in said data network of said other of said first networks supplying said first signals to said local loop line.

36. A method according to claim 30 including the step of storing said data signals indicative of commencement and discontinuance of said first signals to said local loop line in said storage associated with said central control for the data network for said one of said first networks.

37. A communication system according to claim 30 wherein said data signals indicative of commencement and discontinuance of said first signals to said local loop line comprise signals utilizing transaction capabilities application part (TCAP) protocol.

* * * * *